United States Patent
Worden

(10) Patent No.: US 12,173,495 B2
(45) Date of Patent: Dec. 24, 2024

(54) CURVATURE ADJUSTABLE MAGNETIC STRUT

(71) Applicant: Jonathan M. Worden, Twin Falls, ID (US)

(72) Inventor: Jonathan M. Worden, Twin Falls, ID (US)

(*) Notice: Subject to any disclaimer, the term of this patent is extended or adjusted under 35 U.S.C. 154(b) by 140 days.

(21) Appl. No.: 17/711,178

(22) Filed: Apr. 1, 2022

(65) Prior Publication Data

US 2023/0183964 A1    Jun. 15, 2023

Related U.S. Application Data

(63) Continuation-in-part of application No. 29/819,235, filed on Dec. 14, 2021.

(51) Int. Cl.
  *E04B 1/19*    (2006.01)
  *F16L 3/24*    (2006.01)

(52) U.S. Cl.
  CPC .................. *E04B 1/19* (2013.01); *F16L 3/24* (2013.01); *E04B 2001/1924* (2013.01)

(58) Field of Classification Search
  CPC ....... E04B 1/19; E04B 2001/1924; F16L 3/24
  USPC ......................................................... 52/645
  See application file for complete search history.

(56) References Cited

U.S. PATENT DOCUMENTS

| | | | | |
|---|---|---|---|---|
| 6,582,170 B2* | 6/2003 | Dinh | ..................... | F16B 37/046 411/85 |
| 6,872,038 B2* | 3/2005 | Westlake | .............. | F16B 37/046 411/85 |
| 7,624,957 B2* | 12/2009 | Klein | ..................... | F16M 11/22 248/683 |
| 8,277,158 B2* | 10/2012 | Csik | ..................... | F16B 37/046 411/111 |
| 9,103,365 B2* | 8/2015 | Whipple | .............. | F16B 37/045 |
| 9,577,417 B2* | 2/2017 | Stechmann | ............... | F16B 1/00 |
| 10,359,068 B2* | 7/2019 | Martin | ................. | F16B 37/046 |
| 11,181,211 B1* | 11/2021 | Morgan | ................ | F16B 37/045 |
| 11,384,814 B2* | 7/2022 | Rouleau | .................. | H02G 3/32 |
| 11,624,394 B2* | 4/2023 | Schaefer | .............. | F16B 37/045 52/578 |
| 2012/0049013 A1* | 3/2012 | Klein | .................... | H01F 7/0221 248/74.1 |

(Continued)

*Primary Examiner* — James J Buckle, Jr.
(74) *Attorney, Agent, or Firm* — Edison Law Group; Jerome Drabiak

(57) ABSTRACT

The present application is directed to a curvature adjustable magnetic strut for securing pipe, conduit and tubing to a curved structure for storing liquids and gasses, such as a fuel tank. More particularly, several variants of the curvature adjustable magnetic strut is disclosed which enables varying curved or flat surfaces to be accommodated in securing pipe, conduit and tubing to a cylindrical tank, whether that tank be in the vertical or the horizontal position. The curvature adjustable magnetic strut comprises a strut affixed to a base plate having three or more magnets attached. In operation, the base plate can be curvature adjusted using one or more adjustment screws. In related embodiments, varying length struts with varying length single and double hinged bracket assemblies thereon are secured to both securing strut plates and magnet base plates having two or more magnets are used to adjust for varying tank curvature.

5 Claims, 22 Drawing Sheets

(56) References Cited

U.S. PATENT DOCUMENTS

2013/0161481 A1* 6/2013 Kegeris ............... B28B 23/0056
  249/188
2013/0177366 A1* 7/2013 Whipple ............... F16B 37/045
  411/172
2020/0408335 A1* 12/2020 Stechmann ............. F16L 3/221

* cited by examiner

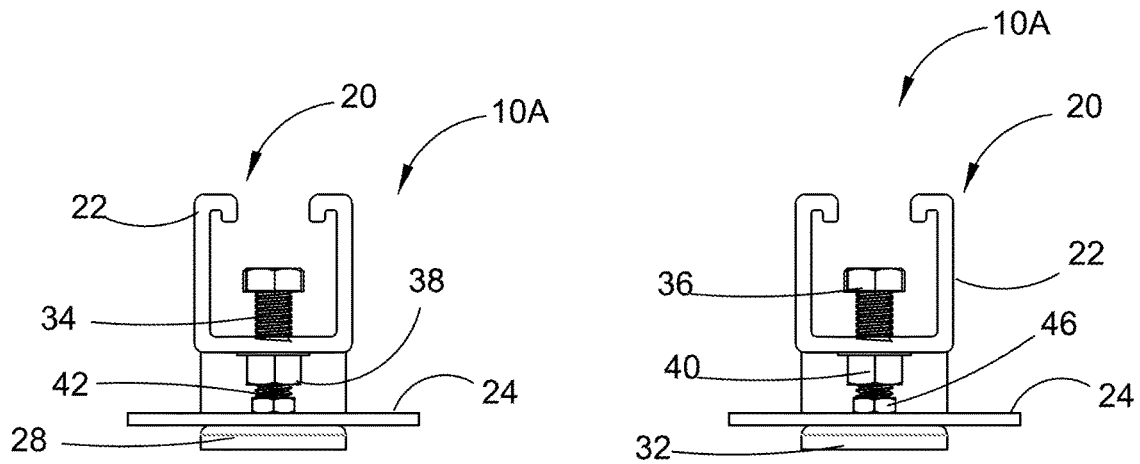
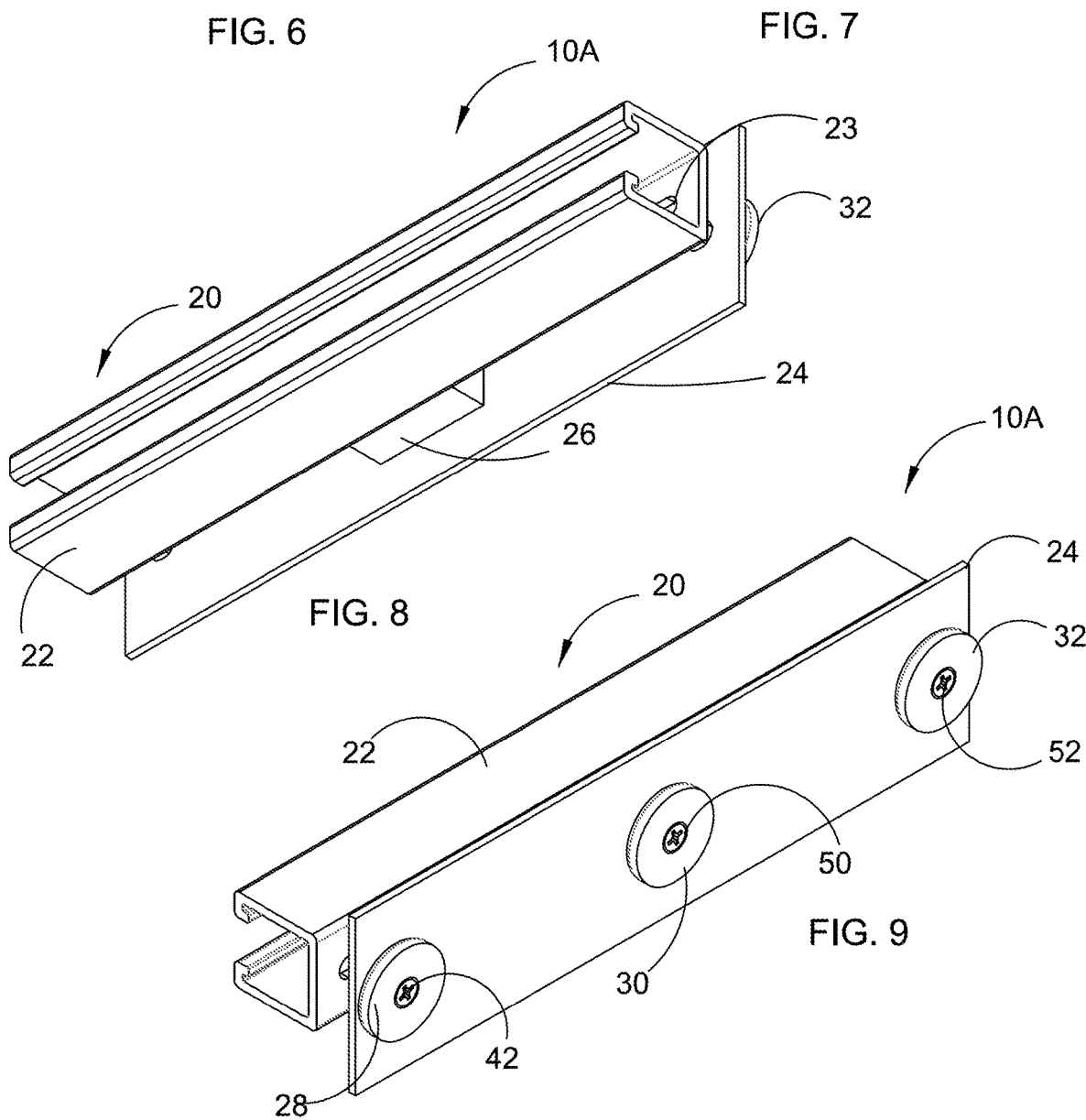

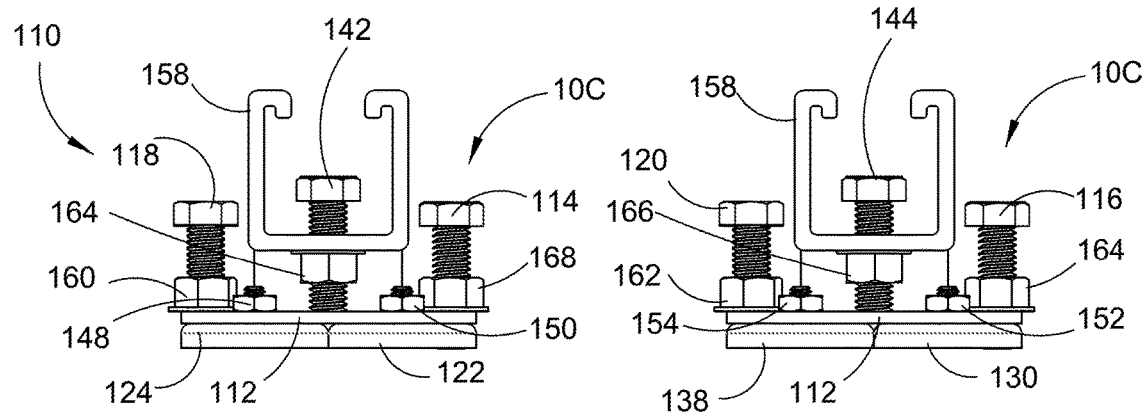
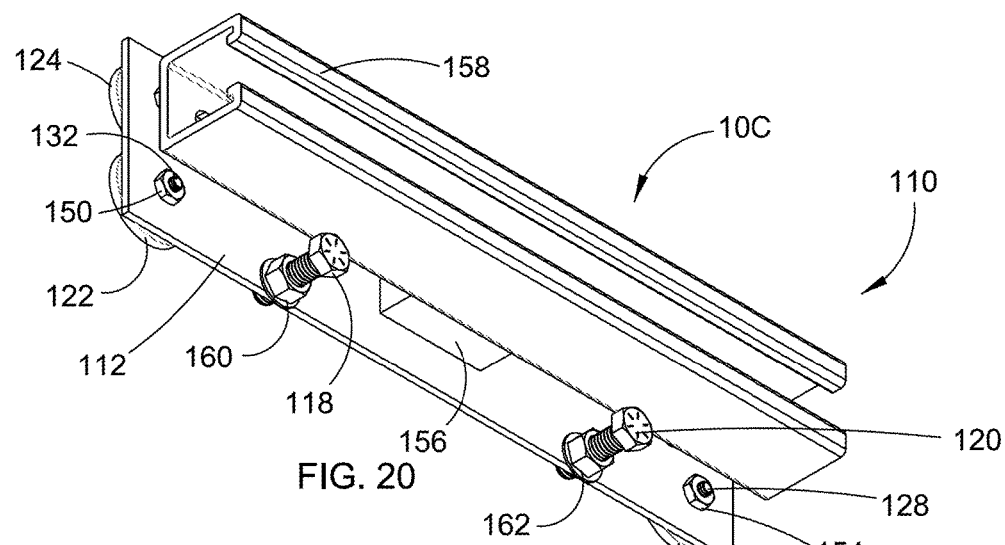
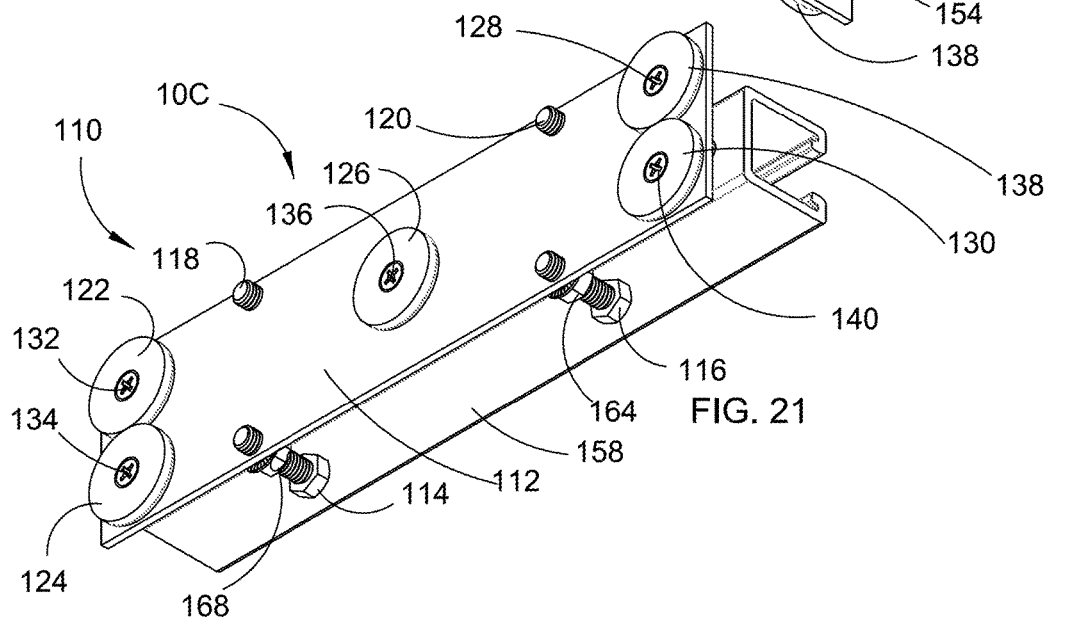

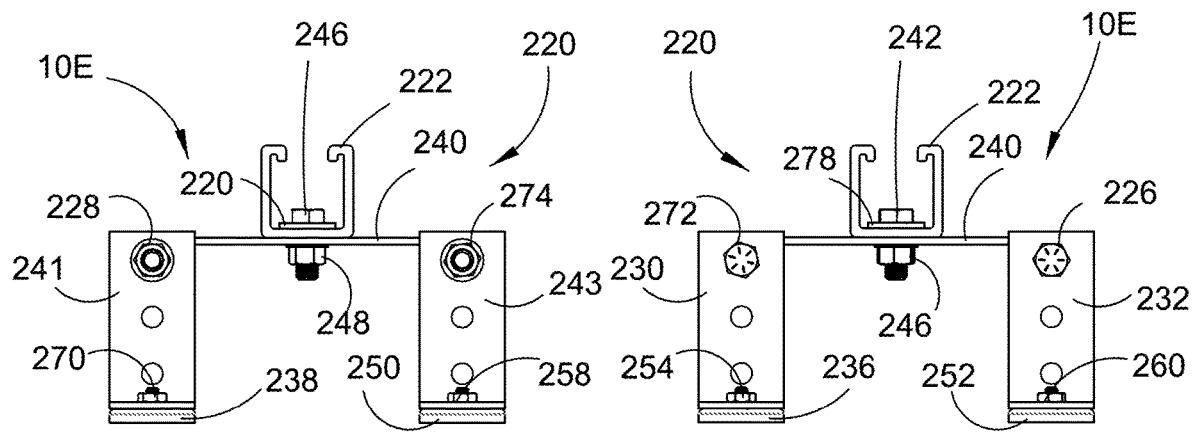
FIG. 30
FIG. 31
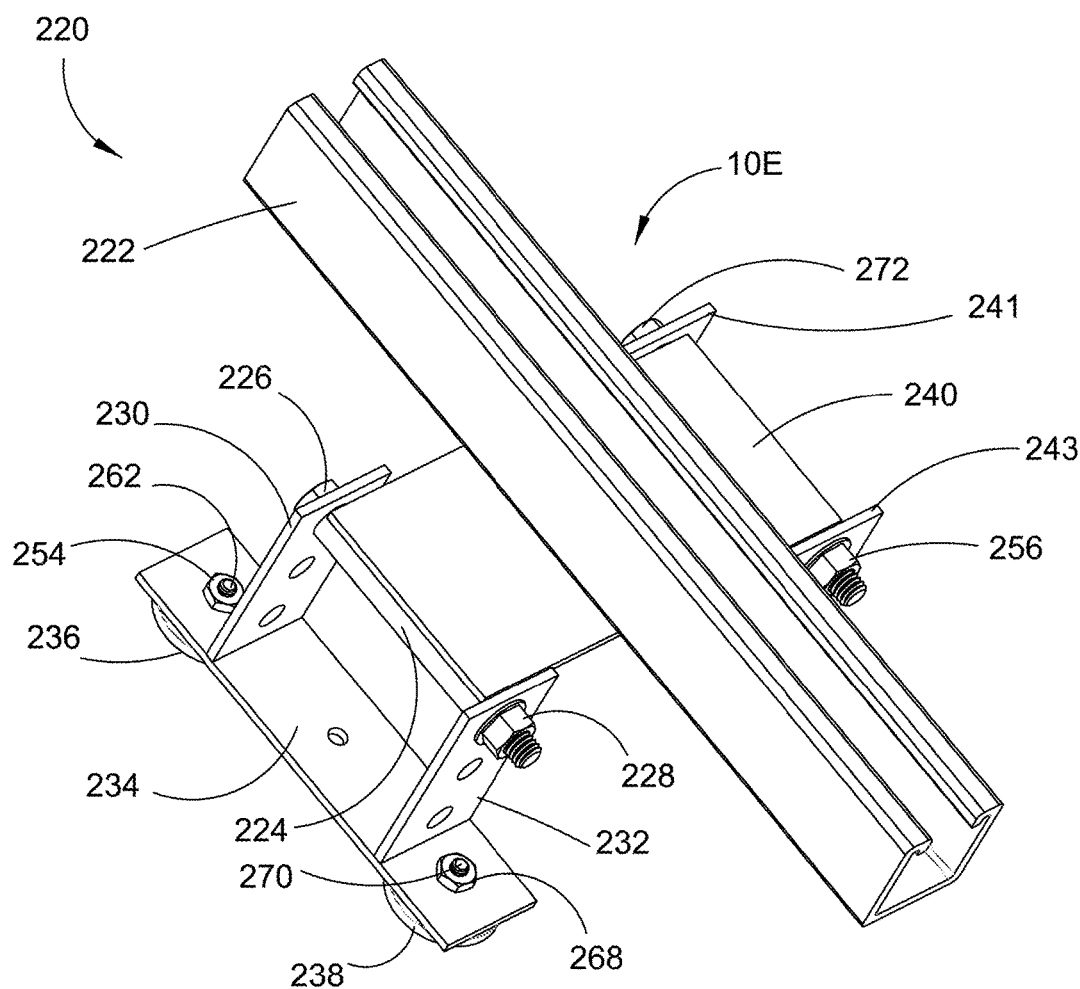
FIG. 32

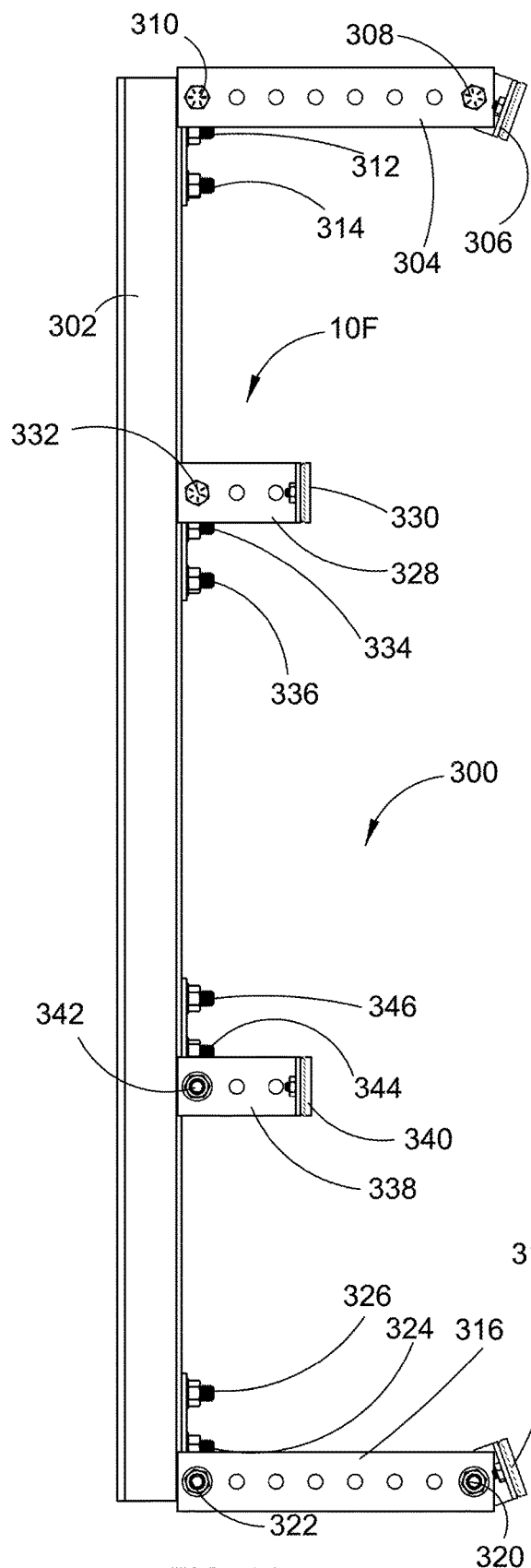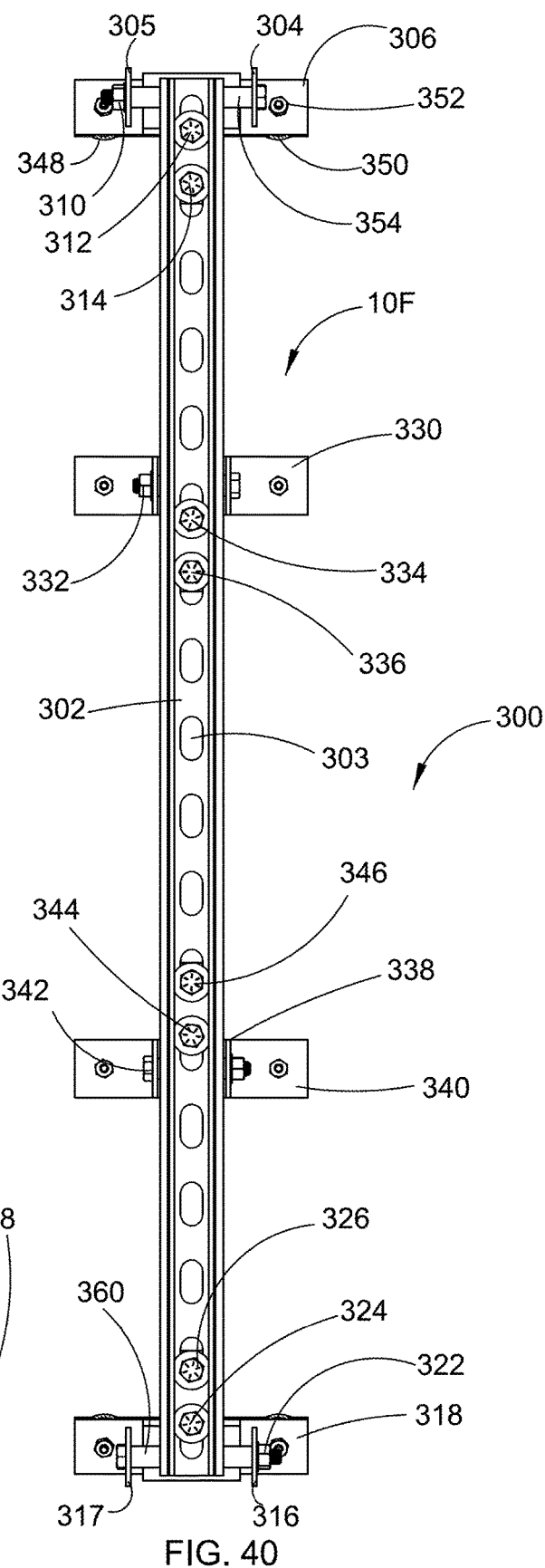
FIG. 39
FIG. 40

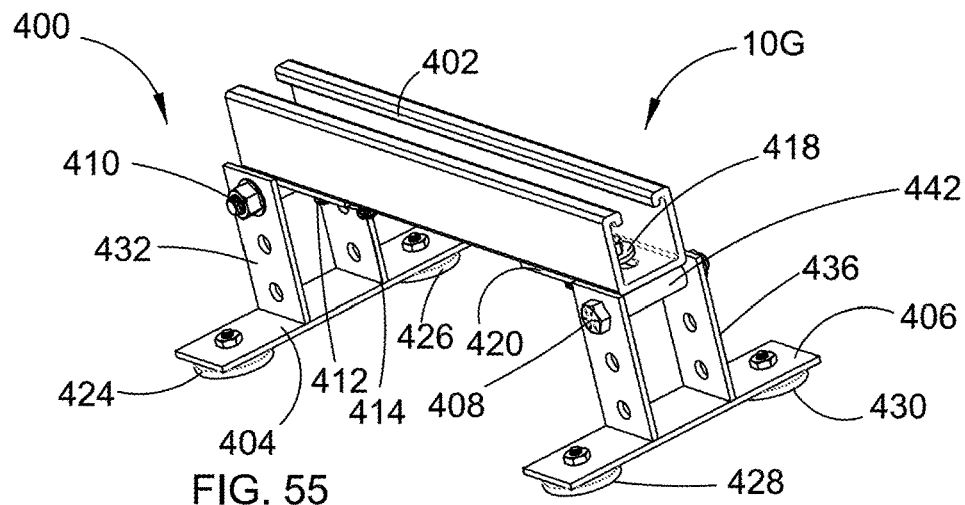
FIG. 55
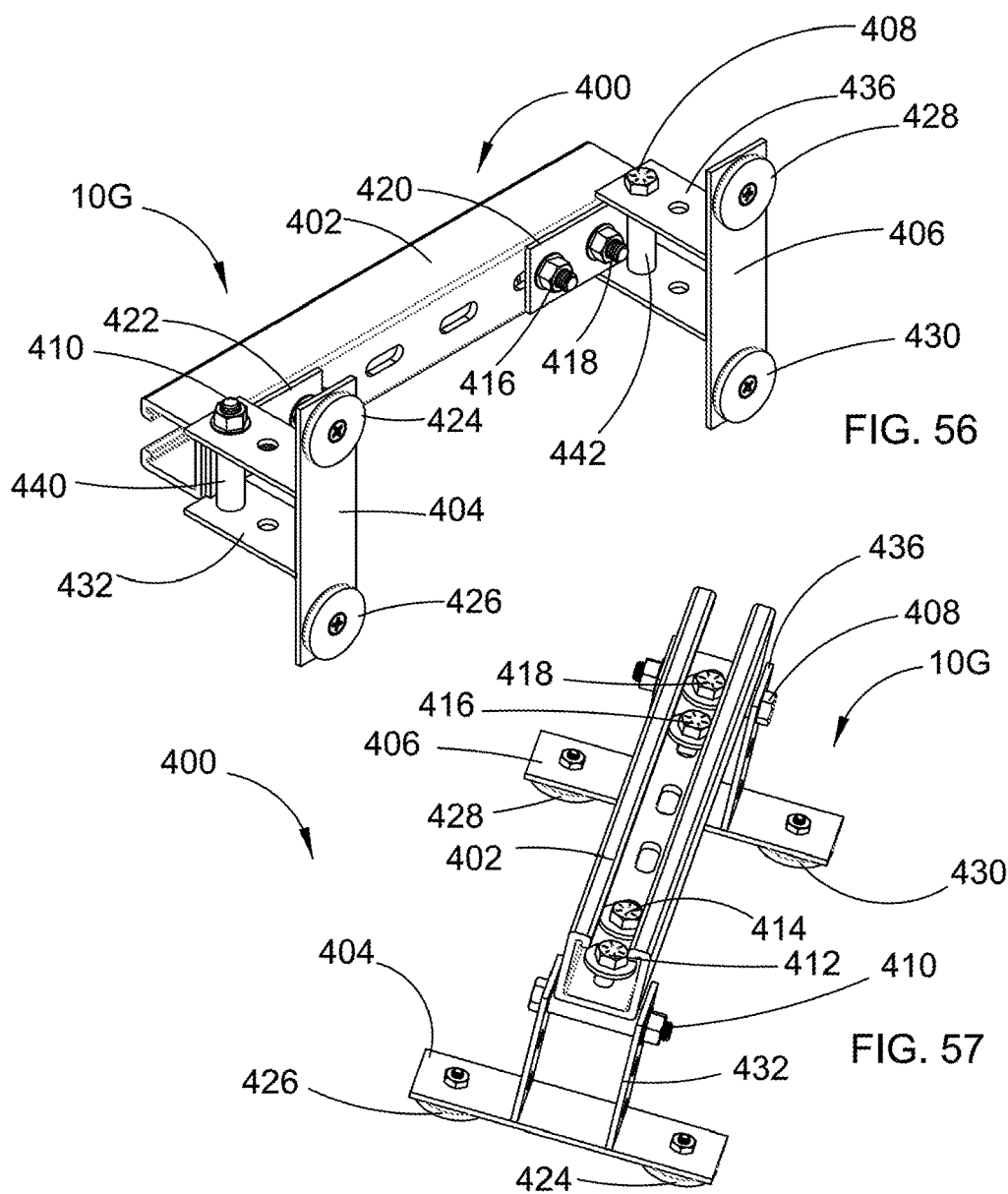
FIG. 56
FIG. 57

CURVATURE ADJUSTABLE MAGNETIC STRUT

CROSS-REFERENCE TO RELATED APPLICATIONS

The present non-provisional patent application is a continuation-in-part (CIP) of Applicant's co-pending patent application Ser. No. 29/819,235 filed on Dec. 14, 2021.

FIELD OF THE INVENTION

This application relates to a curvature adjustable magnetic strut for securing pipe, conduit and tubing to a curved structure for storing liquids and gasses, such as a fuel tank. More particularly, several related variants of the curvature adjustable magnetic strut are disclosed which enables varying curved surfaces to be accommodated in securing pipe, conduit and tubing to a cylindrical tank, whether that tank be in the vertical, like typical fuel storage tanks, or the horizontal position, like typical horizontal propane tanks. The curvature adjustable magnetic strut comprises a strut affixed to a base plate having three or more magnets attached. In operation, the base plate can be curvature adjusted using one or more adjustment screws. In related embodiments, varying length struts with varying length hinged brackets secured base plates having two or more magnets are used to adjust for varying tank curvature.

BACKGROUND OF THE INVENTION

Strut channel, often referred to by one of several manufacturer trade names, such as UNISTRUT®, is a standardized formed structural system used in the construction and electrical industries for light structural support, often for supporting wiring, plumbing, or mechanical components such as air conditioning or ventilation systems. A strut is usually formed from a metal sheet, folded over into an open channel shape with inwards-curving lips to provide additional stiffness and as a location to mount interconnecting components. Increasingly, struts are being constructed from fiberglass, a highly corrosion-resistant material that's known for its lightweight strength and rigidity. Struts usually have holes of some sort in the base, to facilitate interconnection or fastening strut to underlying building structures. The main advantage of strut channels in construction is that there are many options available for rapidly and easily connecting lengths together and other items to the strut channel, using various specialized strut-specific fasteners and bolts. They can be assembled very rapidly with minimal tools and only moderately trained labor, which reduces costs significantly in many applications. A strut channel installation also can often be modified or added-to relatively easily if needed. The only alternative to strut channels for most applications is custom fabrication using steel bar stock and other commodity components, requiring welding or extensive drilling and bolting, which has none of the above advantages.

In US units, the basic typical strut channel forms a box 1⅝ inch by 1⅝ inch. In metric units, this is a 41 mm by 41 mm unit. There are several additional sizes and combined shapes manufactured. Basic strut channel comes in the open box section, 1⅝ by 1⅝ inch (41×41 mm) square cross section. A half height (1⅝ inch wide, 13/16 inch tall-41×21 mm) cross section version is also available, used mostly where mounted directly to a wall as it has significantly less stiffness and ability to carry loads across an open space or brace. A deep channel 2 7/16 inches tall and 1⅝ inch wide is also manufactured (82×41 mm). The material used to form the channel is typically 12 gauge (0.1046 inch) or 14 gauge (0.0747 inch) thick sheet metal, or 1.5 mm and 2.5 mm in metric units.

Regarding types of channel, several variations are available with different hole patterns for mounting to walls and supports. Solid channel has no holes predrilled, and must either be drilled on site or mounted in another fashion. Punched channel has round holes, large enough for ⅝ inch threaded steel rod or bolts, punched in the top of the channel at regular 1⅞ inch centers. Half-slot channel has short, rounded end rectangular slots punched out on 2 inch centers. Slot channel has longer slots on 4 inch centers. In metrical system based products, the eyelets are about 11×13 mm. In addition, shapes are manufactured with two lengths of channel welded together back to back, or three or four welded together in various patterns, to form stronger structural elements. Strut is normally made of sheet steel, with a zinc coating (galvanized), paint, epoxy, powder coat, or other finish. Strut channel is also manufactured from stainless steel for use where rusting might become a problem (e.g., outdoors, facilities with corrosive materials), from aluminium alloy when weight is an issue or from fiberglass for very corrosive environments. The inwards-facing lips on the open side of strut channel are routinely used to mount special nuts, braces, connecting angles, and other types of interconnection mechanism or device to join lengths of strut channel together or connect pipes, wire, other structures, threaded rod, bolts, or walls into the strut channel structural system.

Strut channel is commonly used to mount, brace, support, and connect lightweight structural loads in building construction. These include pipes, electrical and data wire, mechanical systems such as ventilation, air conditioning, and other mechanical systems. Objects can be attached to the strut channel with a bolt, threaded into a channel nut, that may have a spring to ease installation. Circular objects such as pipes or cables may be attached with straps that have a shaped end to be retained by the channel. Strut channel is also used for other applications that require a strong framework, such as workbenches, shelving, systems, equipment racks, etc. Specially made sockets are available to tighten nuts, bolts, etc. inside the channel, as normal sockets are unable to fit through the opening.

Most steel constructed fuel storage tanks are vertical cylinders, such as a common above around gas storage tank. Typically, steel constructed above ground gas storage tanks are horizontal cylinders with rounded ends, such as a common propane storage tank. Often there is a need to affix or support piping, conduit or tubing to above ground fuel storage tanks and propane storage tanks. After these tanks are filled with fuel or gas, welding, drilling for bolts and the use of screws to support piping is not an option. Furthermore, anyone other than the manufacturer welding on the tank would void any warranty. Therefore, there exists a need for a quick and easy way of installing piping on a fuel tank containing a flammable fuel or flammable gas without welding or drilling which jeopardizes the safety of the installer.

Generally, piping, conduit and tubing to be affixed to a steel constructed fuel storage tank or gas storage tank are first anchored to the ground and some means of fastening or clamping can be managed at the top of the tank. When using this common method, there is no support between these two points, the ground and the top of the tank, which many tanks can sometimes be 40 feet or more in height. In the past, people have tried to tie wire around the tank to try and hold piping to the tank. This is just as unrefined and ineffective as it sounds. Therefore, there exists a need to have the ability to fasten strut for pipe support on above ground storage fuel and gas tanks quickly and effectively without the need to weld or drill holes.

Whereas, strut, such as UNISTRUT® is widely used to support piping, conduit and tubing to structures such as fuel tanks, there exists a long felt need to be able to mount the strut to the tank even when the fuel tank is full of fuel, without the use of welding or drilling holes, or screwing into the fuel storage tank in an unsafe manner.

In this respect, before explaining at least one embodiment of the Curvature Adjustable Magnetic Strut in greater detail, it is to be understood that the design is not limited in its application to the details of construction and to the arrangement of the components set forth in the following description or illustrated in the drawings. The Curvature Adjustable Magnetic Strut is capable of other embodiments and of being practiced and carried out in various ways. Also, it is to be understood that the phraseology and terminology employed herein are for the purpose of description and should not be regarded as limiting.

SUMMARY OF THE INVENTION

The preferred embodiment of the Curvature Adjustable Magnetic Strut allows for quick and easy installation of pipe, conduit and tubing onto the outer surface of variably curved storage tanks, especially fuel storage tanks and gas storage tanks where the fuel and the gas are flammable materials.

The primary advantage of the Curvature Adjustable Magnetic Strut is that it allows toolless installation of a curvature adjustable strut by attaching the curvature adjustable magnetic strut to the tank structure using magnets.

Another advantage of the Curvature Adjustable Magnetic Strut is that it allows for installation without having to weld on, or drill into, fuel storage tanks, especially when they are full or partially full of flammable fuel or flammable gas and it is unsafe to weld or drill.

Yet another advantage of the Curvature Adjustable Magnetic Strut is that it will adjust to any curvature of a fuel tank to allow the magnets to securely hold the curvature adjustable magnetic strut assembly to the fuel tank or other tank as required.

These together with other advantages of the Curvature Adjustable Magnetic Strut, along with the various features of novelty, which characterize the design are pointed out with particularity in the claims annexed to and forming a part of this disclosure. For a better understanding of the Curvature Adjustable Magnetic Strut its operating advantages and the specific objects attained by its uses, reference should be made to the accompanying drawings and descriptive matter in which there are illustrated the preferred and alternate embodiments of the Curvature Adjustable Magnetic Strut. There has thus been outlined, rather broadly, the more important features of the design in order that the detailed description thereof that follows may be better understood, and in order that the present contribution to the art may be better appreciated. There are additional features of the Curvature Adjustable Magnetic Strut that will be described hereinafter, and which will form the subject matter of the claims appended hereto.

The preferred embodiment of the Curvature Adjustable Magnetic Strut will have a variable length strut member with securing strut base plates, one or more magnet base plates affixed to the variable length strut member, two or more magnets attached to each magnet base plate and one or more adjustment screws to adjust the curvature of the magnet base plate to match the curvature of the fuel tank having the curvature adjustable magnetic strut assemblies installed thereon.

In alternate embodiments, the Curvature Adjustable Magnetic Strut will have a variable length strut member with securing strut base plates, one or more magnet base plates affixed to the variable length strut member, two or more magnets attached to each magnet base plate and either two or more strut base plates secured single hinged bracket assemblies including one or more magnetic base plates affixed to each bracket assembly, or two or more strut base plates secured double hinged bracket assemblies including one or more hinged magnetic base plates affixed to each hinged bracket assembly having a hinged magnetic base plate.

The Curvature Adjustable Magnetic Strut primary features will include as prominent design and operational features:

a variable length strut member with securing strut base plates;

one or more magnet base plates affixed to the variable length strut member;

two or more magnets attached to each magnet base plate;

two or more strut base plates secured single hinged bracket assemblies including one or more magnetic base plates affixed to each bracket assembly; and two or more strut base plates secured double hinged bracket assemblies including one or more hinged magnetic base plates affixed to each hinged bracket assembly having a hinged magnetic base plate.

With respect to the above description then, it is to be realized that the optimum dimensional relationships for the parts of the Curvature Adjustable Magnetic Strut, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Curvature Adjustable Magnetic Strut. Further, since numerous modifications and changes will readily occur to those skilled in the art, it is not desired to limit the Curvature Adjustable Magnetic Strut to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Curvature Adjustable Magnetic Strut and together with the description, serve to explain the principles of this application.

FIG. 6 depicts a front view of a curvature adjustable magnetic strut having three magnets affixed to the magnet base plate, according to the present invention.

FIG. 7 depicts a rear view of a curvature adjustable magnetic strut having three magnets affixed to the magnet base plate, according to the present invention.

FIG. 8 depicts a top, side and rear perspective view of a curvature adjustable magnetic strut having three magnets affixed to the magnet base plate, according to the present invention.

FIG. 9 depicts a bottom, side and front perspective view of a curvature adjustable magnetic strut having three magnets affixed to the magnet base plate, according to the present invention.

FIG. 18 depicts a front view of a curvature adjustable magnetic strut having five magnets affixed to the magnet base plate, and including four stabilizing bolts therein, according to the present invention.

FIG. 19 depicts a rear view of a curvature adjustable magnetic strut having five magnets affixed to the magnet base plate, and including four stabilizing bolts therein, according to the present invention.

FIG. 20 depicts a top, side and front perspective view of a curvature adjustable magnetic strut having five magnets affixed to the magnet base plate, and including four stabilizing bolts therein, according to the present invention.

FIG. 21 depicts a bottom, side and rear perspective view of a curvature adjustable magnetic strut having five magnets affixed to the magnet base plate, and including stabilizing bolts therein, according to the present invention.

FIG. 30 depicts a front view of a curvature adjustable magnetic strut having a securing plate having two hinged brackets attached to two base plates, wherein the curvature is adjusted by rotation of the two hinges to align the two base plates, each having two magnets.

FIG. 31 depicts a rear view of a curvature adjustable magnetic strut having a securing plate having two hinged brackets attached to two base plates, wherein the curvature is adjusted by rotation of the two hinges to align the two base plates, each having two magnets.

FIG. 32 depicts a top, side and front perspective view of a curvature adjustable magnetic strut having a securing plate having two hinged brackets attached to two base plates, wherein the curvature is adjusted by rotation of the two hinges to align the two base plates, each having two magnets.

FIG. 39 depicts a side elevational view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 40 depicts a top plan view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 55 depicts a top, side and front perspective view of a curvature adjustable magnetic strut having two strut base plates securing two hinged brackets one on each end of the strut, wherein the hinged brackets each have a base plate including one or more magnets, here having two magnets per base plate.

FIG. 56 depicts a bottom, side and front perspective view of a curvature adjustable magnetic strut having two strut base plates securing two hinged brackets one on each end of the strut, wherein the hinged brackets each have a base plate including one or more magnets, here having two magnets per base plate.

FIG. 57 depicts a top, side and front perspective view of a curvature adjustable magnetic strut having two strut base plates securing two hinged brackets one on each end of the strut, wherein the hinged brackets each have a base plate including one or more magnets, here having two magnets per base plate.

DETAILED DESCRIPTION OF THE PREFERRED EMBODIMENTS

As required, the obvious variants and detailed embodiments of the present Curvature Adjustable Magnetic Strut 10A, 10B, 10C, 10D, 10E, 10F and 10G are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
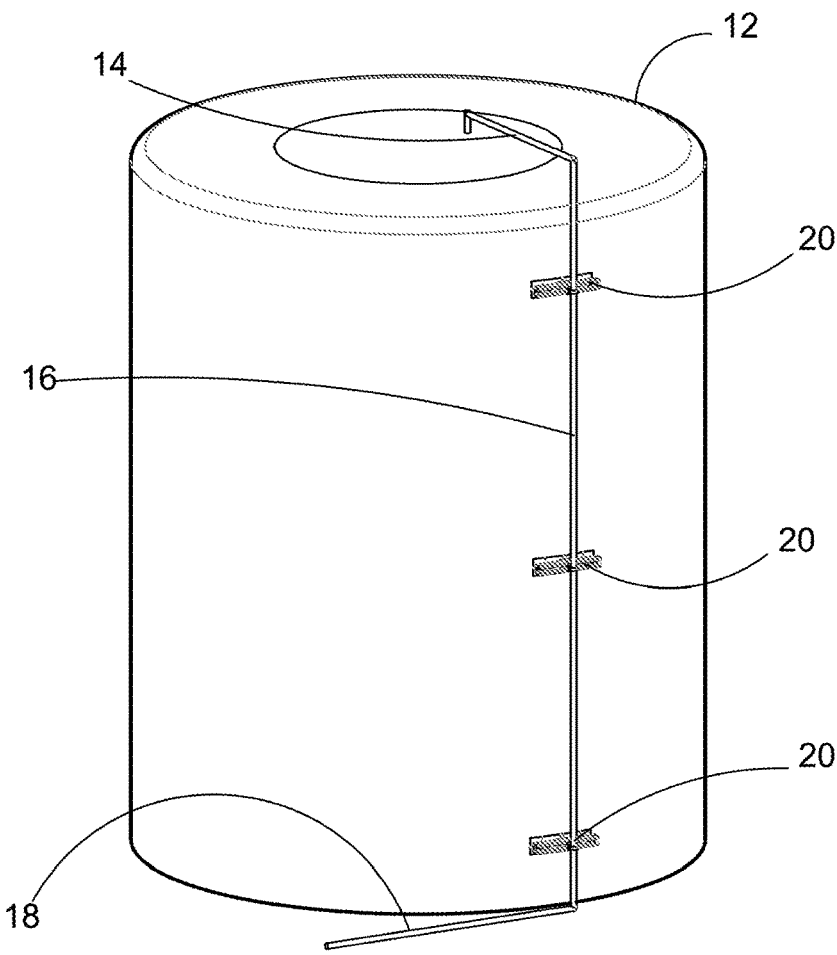
FIG. 1 depicts a top and side elevational perspective view of a vertical liquid storage tank having a fill pipe attached to the outer surface using three curvature adjustable magnetic strut units to secure the fill pipe to the tank, according to the present invention.

Referring now to FIG. 1, a top, side and front perspective view of a vertical liquid storage tank 12 is depicted, having a fill pipe upper portion 14, middle portion 16 and lower or ground portion 18 attached to the outer surface using three curvature adjustable magnetic strut assemblies 20 installed to secure the fill pipe to the tank, according to the present invention. The three curvature adjustable magnetic strut assemblies 20 are optimally located and evenly spaced apart at the lower portion of the pipe 18, middle portion of the pipe 16 and upper portion of the fill pipe 14. Each of the three curvature adjustable magnetic strut assemblies 20 have been curvature adjusted to conform closely to the curvature of the fuel tank 12. The three curvature adjustable magnetic strut assemblies 20 are secured to the outer surface of the fuel tank 12 by magnets located on the lower side of the curvature adjustable magnetic strut assemblies 20 (see below). By using magnets to secure the curvature adjustable magnetic strut assemblies 20, the pipe supporting structure can be installed without the need for welding or tools other than a socket wrench. In this way, pipe supporting struts can be quickly, easily and securely installed on any existing fuel tank with a magnetic surface, and installed in any number of units and spacings, including installations on both curved tank surfaces and flat tank surfaces.

Figure 2:
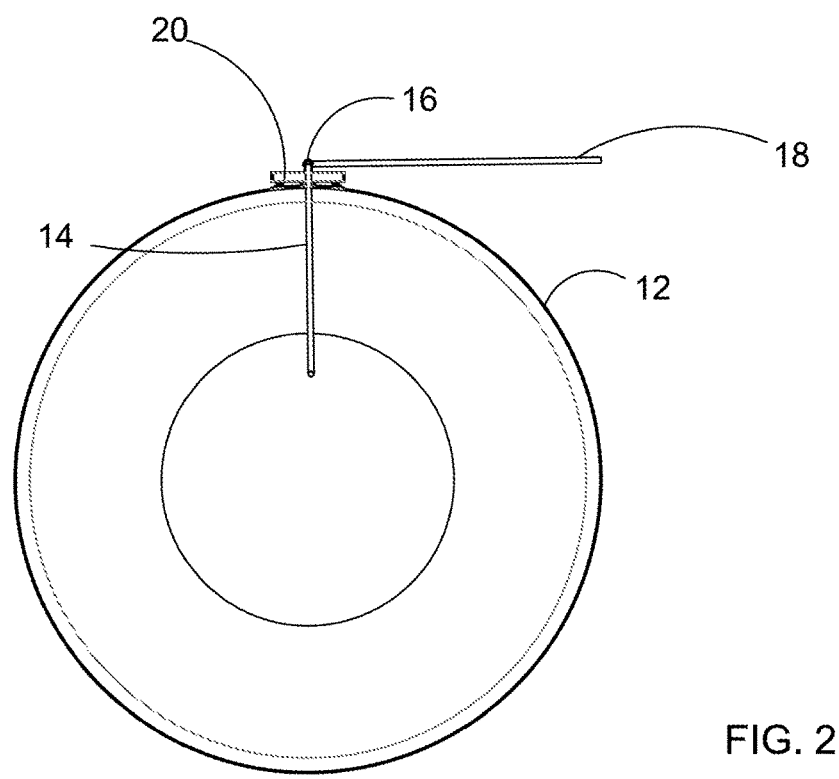
FIG. 2 depicts a top plan view a vertical liquid storage tank having a fill pipe attached to the outer surface using three curvature adjustable magnetic strut units to secure the fill pipe to the tank, as shown in FIG. 1, according to the present invention.

FIG. 2 depicts a top plan view a vertical liquid storage tank 12 having a fill pipe 14, 16 and 18 attached to the outer surface of the vertical liquid storage tank 12 using three (with only one visible here in this top plan view) curvature adjustable magnetic strut assemblies 20 to secure the fill pipe upper, middle and lower portions to the vertical liquid storage tank 12, as shown in FIG. 1, according to the present invention. It is anticipated that the fuel or gas storage tank may also be in a horizontal configuration, such as a common propane storage tank, and that the same curvature adjustable magnetic strut assemblies 20 may be used to support pipe, conduit and tubing thereto in a similar fashion. For horizontally configured tanks, since the curvature is vertically oriented, then the curvature adjustable magnetic strut assemblies 20 would be installed at a 90 degree angle to those shown installed in FIG. 1 and here in FIG. 2.

Figure 3:
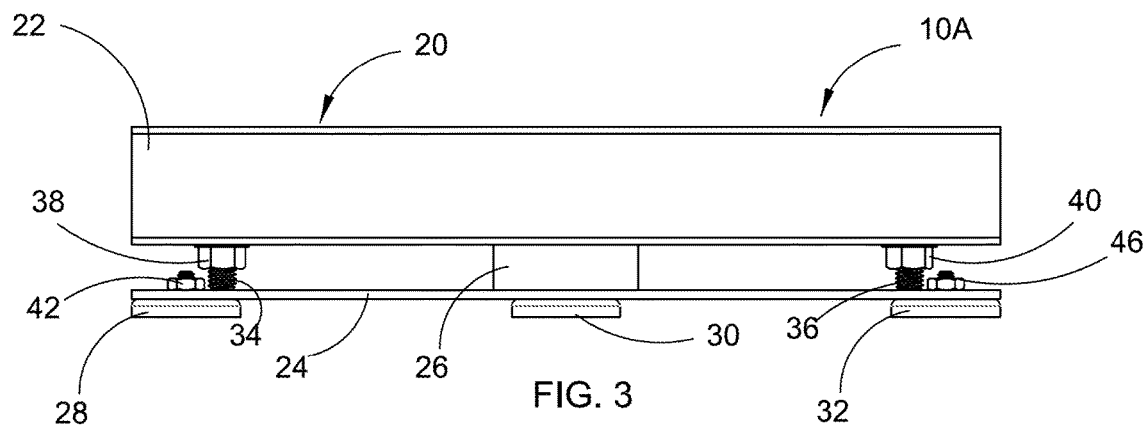
FIG. 3 depicts a side elevational view of a curvature adjustable magnetic strut having three magnets affixed to the magnet base plate, according to the present invention.

FIG. 3 depicts a side elevational view of an embodiment of a curvature adjustable magnetic strut 10A assembly 20 having a configuration of three magnets affixed to the base plate, according to the present invention. The strut channel 22 can be any of the UNISTRUT® Models, including but not limited to, Models P1000, P1100, P3000, P3300, P4000, P4100, P5000 and P5500. Additionally, it is anticipated that the strut channel may be slotted in various slot configurations. The preferred embodiments all use slotted strut channel, and the preferred strut used here is UNISTRUT® Model is P1000 slotted channel. The strut 22 is bolted, screwed or welded to a middle block 26 which is secured to the magnet base plate 24. The magnetic base plate 24 includes three magnets 28, 30 and 32 affixed to the underside of the magnetic base plate 24. Curvature adjustment bolts 34 and 36 and nuts 38 and 40 (the bolt heads are not visible here, see below) are mounted through a slot 23 (see below) in the slotted strut channel 22 and make contact with the magnet base plate 24. The magnets 28, and 32 are secured to the magnet base plate using magnet retaining screws having screw nuts 42 and 46 visible here.

Figure 4:
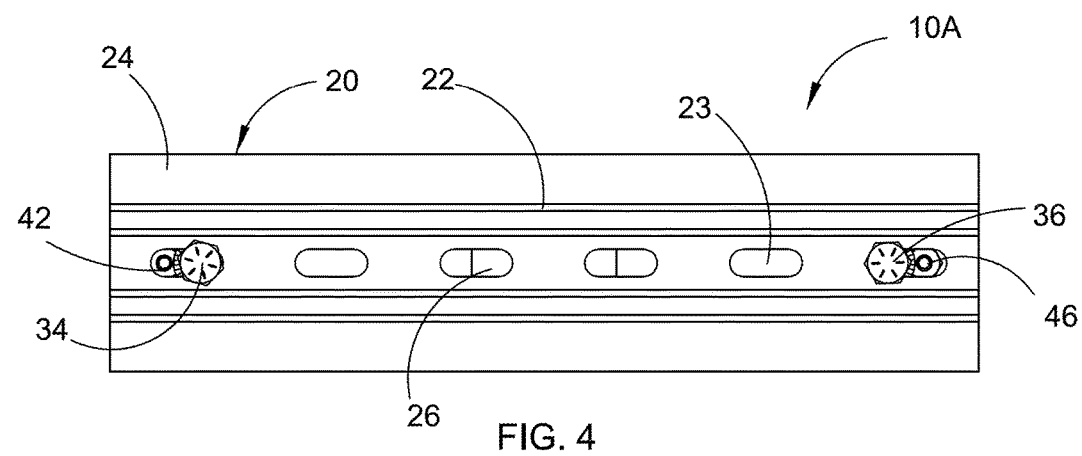
FIG. 4 depicts a top plan view of a curvature adjustable magnetic strut having three magnets affixed to the magnet base plate, according to the present invention.

FIG. 4 depicts a top plan view of a curvature adjustable magnetic strut embodiment 10A assembly 20 having three magnets affixed to the base plate, according to the present invention. Here is shown the slotted strut channel 22 with slot 23 and the curvature adjustment bolts 34 and 36, here showing the bolt heads. Also seen here through the slots in the slotted strut channel are the magnet retaining screw nuts 42 and 46 as well as the middle connection block 26 seen through the slots 23 in the slotted strut channel 22.

Figure 5:
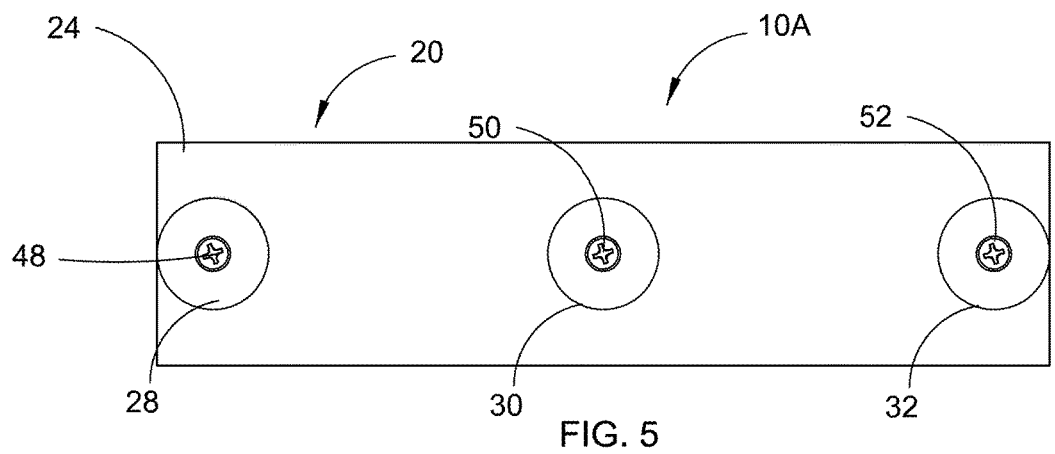
FIG. 5 depicts a bottom view of a curvature adjustable magnetic strut having three magnets affixed to the magnet base plate, according to the present invention.

FIG. 5 depicts a bottom view of a curvature adjustable magnetic strut embodiment 10A assembly 20 having three magnets affixed to the base plate, according to the present invention. The three magnets 28, 30 and 32 are fastened to the magnet base plate 24 using magnet retaining screws 48, 50 and 52, respectively. The corresponding magnet retaining nuts are not seen in this view.

FIG. 6 depicts a front view of a curvature adjustable magnetic strut embodiment 10A assembly 20 having three magnets affixed to the base plate, according to the present invention. This FIG. 6 front view better illustrates the structure of the curvature adjustment bolt 34 and corresponding curvature adjustment nut 38. When curvature adjustment is required, curvature adjustment bolt 34 is rotated and the bolt presses against magnet base plate 24 and causes the magnet base plate 24 to curve, the more the curvature adjustment bolt 34 is tightened down, the more the magnet base plate 24 curves to accommodate the curvature of a fuel tank 12 outer surface. In this way, the optimum surface area of the magnet to tank 12 surface is achieved in order to securely fasten the assembly 20 to the outer surface of a tank.

FIG. 7 depicts a rear view of a curvature adjustable magnetic strut embodiment 10A assembly 20 having three magnets affixed to the base plate, according to the present invention. This FIG. 7 rear view better illustrates the structure of the opposite curvature adjustment bolt 36 and corresponding curvature adjustment nut 40. When curvature adjustment is required, curvature adjustment bolt 36 is rotated and the bolt presses against magnet base plate 24 and causes the magnet base plate 24 to curve, the more the curvature adjustment bolt 34 is tightened down, the more the magnet base plate 24 curves to accommodate the curvature of a fuel tank outer surface. In order to reverse this curvature adjustment, the curvature adjustment 36 bolt is reverse rotated to apply less pressure, and thereby less curvature, to the magnet base plate 24.

FIG. 8 depicts a top, side and rear perspective view of a curvature adjustable magnetic strut embodiment 10A assembly 20 having three magnets affixed to the base plate, according to the present invention. Here is illustrated the middle connection block 26 spanning the slotted strut channel 22 and magnet base plate 24.

FIG. 9 depicts a bottom, side and front perspective view of a curvature adjustable magnetic strut embodiment 10A assembly 20 having three magnets affixed to the base plate, according to the present invention. This view clearly shows the positioning of the three magnets 28, 30 and 32 being held in place on the magnet base plate 24 using magnet retaining screws 42, 50 and 52, respectively.

Figure 10:
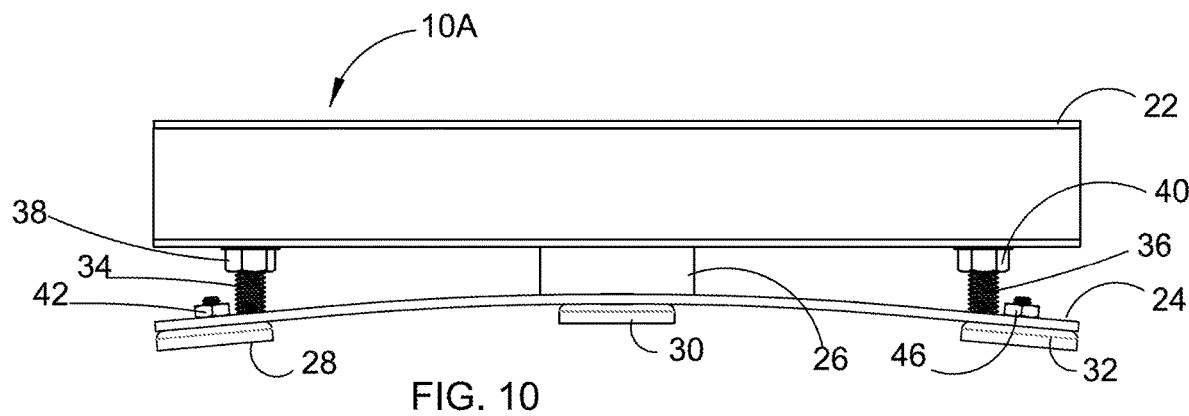
FIG. 10 depicts a side elevational view of a curvature adjustable magnetic strut having three magnets affixed to the magnet base plate, wherein the curvature adjustment bolts have been rotated and extended to adjust the curvature of the base plate, according to the present invention.

FIG. 10 depicts a side elevational view of a curvature adjustable magnetic strut embodiment 10A assembly 20 having three magnets 28, 30 and 32 affixed to the magnet base plate 24, wherein the curvature adjustment bolts 34 and 36 on each end have been extended to adjust the curvature of the magnet base plate 24, according to the present invention. In this way, the assembly 20 can be curvature adjusted on the magnet base plate 24 to closely parallel the curved surface of a tank 12, making the magnetic securing of the assembly 20 optimally strong against the outer surface of the tank 12.

Figure 11:
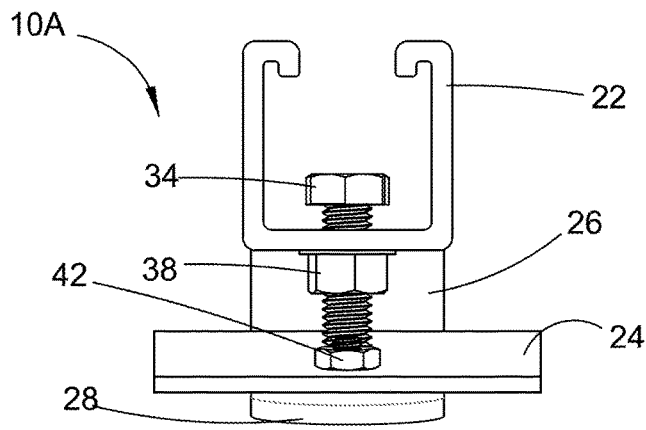
FIG. 11 depicts a front view of a curvature adjustable magnetic strut having three magnets affixed to the magnet base plate, wherein the curvature adjustment bolts have been rotated and extended to adjust the curvature of the base plate, according to the present invention.

FIG. 11 depicts a front view of a curvature adjustable magnetic strut embodiment 10A assembly 20 having three magnets 28, 30 and 32 affixed to the base plate 24, wherein the curvature adjustment bolts 34 and 36 have been extended to adjust the curvature of the base plate, according to the present invention. This FIG. 11 front view better illustrates the structure of the curvature adjustment bolt 34 and corresponding curvature adjustment nut 38 when extended out against the magnet base plate 24. When curvature adjustment is required, curvature adjustment bolt 34 is rotated and the bolt presses against magnet base plate 24 and causes the magnet base plate 24 to curve, the more the curvature adjustment bolt 34 is tightened down, the more the magnet base plate 24 curves to accommodate the curvature of a fuel tank 12 outer surface. In this way, the magnets lay flat on the tank surface and the optimum surface area of the magnets to tank 12 surface is achieved in order to securely fasten the assembly 20 to the outer surface of a tank.

Figure 12:
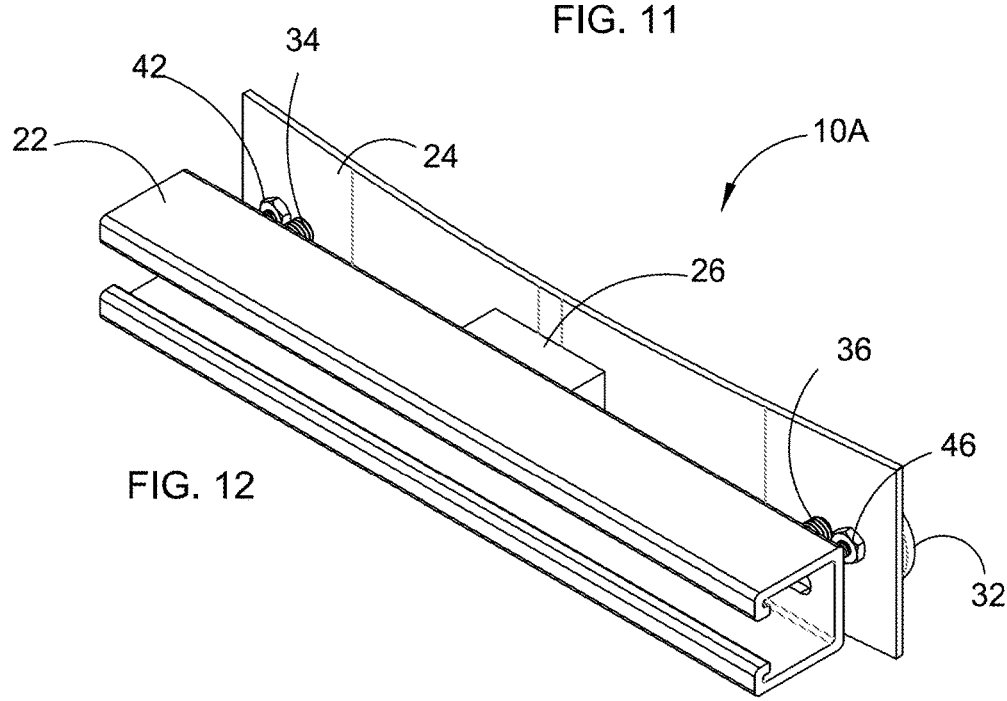
FIG. 12 depicts a top, side and front perspective view of a curvature adjustable magnetic strut having three magnets affixed to the magnet base plate, wherein the curvature adjustment bolts have been rotated and extended to adjust the curvature of the base plate, according to the present invention.

FIG. 12 depicts a top, side and front perspective view of a curvature adjustable magnetic strut embodiment 10A assembly 20 having three magnets 28, 30 and 32 affixed to the base plate 24, wherein the curvature adjustment bolts 34 and 36 have been extended to adjust the curvature of the base plate, according to the present invention. Also seen here is the middle connection block 26.

Figure 13:
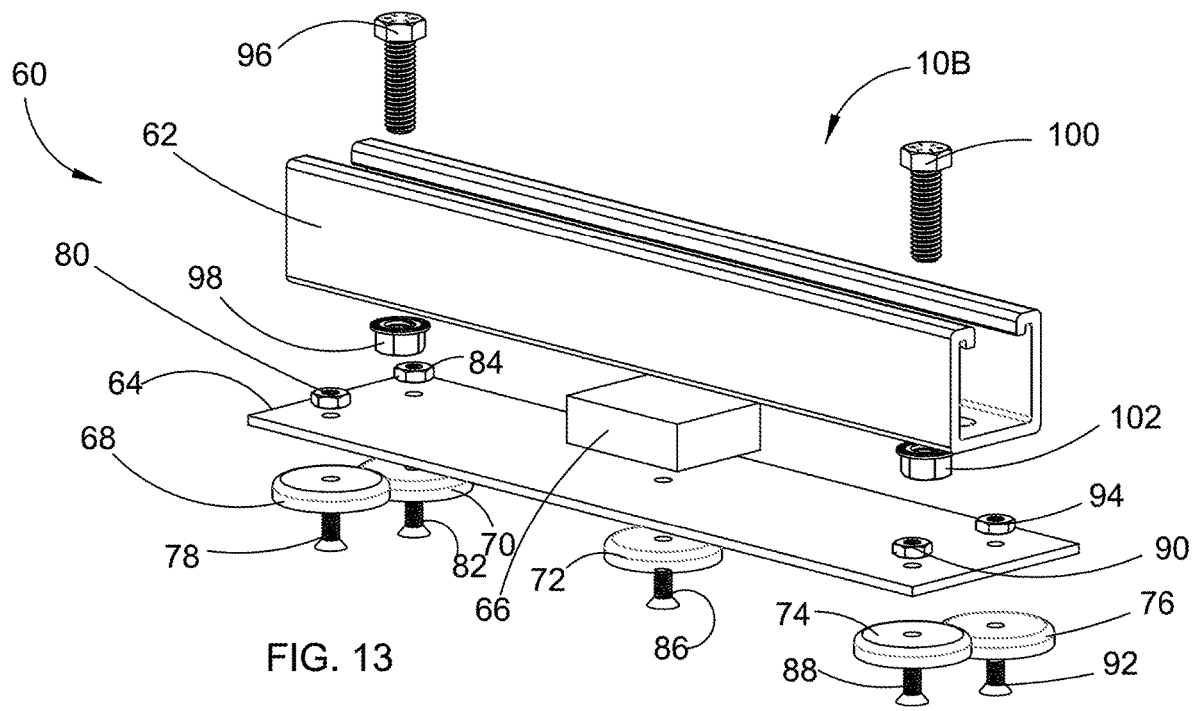
FIG. 13 depicts a top, side and front perspective view exploded diagram of a curvature adjustable magnetic strut having five magnets affixed to the magnet base plate, according to the present invention.

FIG. 13 depicts a top, side and front perspective view exploded diagram of another curvature adjustable magnetic strut embodiment 10B assembly 60 having five magnets affixed to the base plate, according to the present invention. As shown, a slotted strut channel 62 is fastened to a middle connection block 66 which is secured to a magnet base plate 64. The magnet base plate 64 has five magnets 68, 70, 72, 74 and 76 attached to it using magnet retaining screws 78, 82, 86, 88 and 92 having corresponding magnet retaining nuts 80, 84, 90 and 94. Curvature adjustment bolts 96 and 100 have corresponding curvature adjustment nuts 98 and 102.

Figure 14:
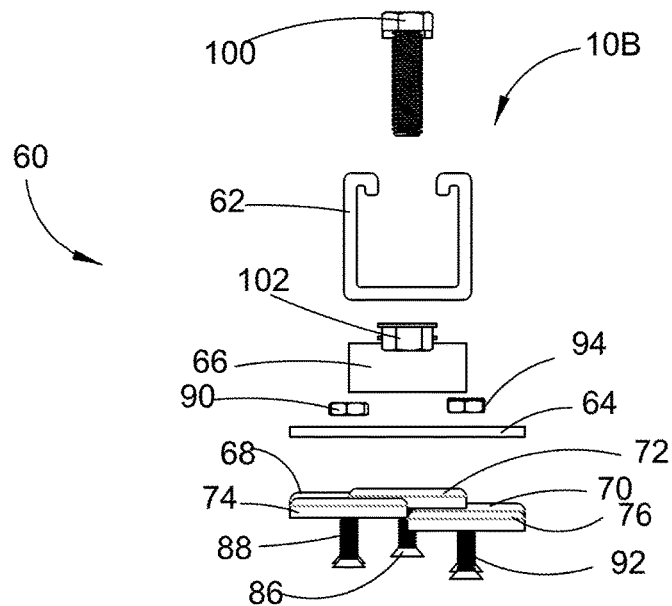
FIG. 14 depicts a front exploded view of a curvature adjustable magnetic strut having five magnets affixed to the magnet base plate, according to the present invention.

FIG. 14 depicts a front exploded view of another curvature adjustable magnetic strut embodiment 10B assembly 60 having five magnets 68, 70, 72, 74 and 76 affixed to the base plate 64, according to the present invention. This FIG. 14 better illustrates the assembly 60 showing the curvature adjustment bolt 100 and nut 102 as it would pass through the end slot in the slotted strut channel 62. Also shown here is the position of the middle connection block 66 with relation to the magnet base plate 64. Magnets 70, 72 and 74 are shown in relation to magnet retaining screws 86, 88 and 92 and corresponding magnet retaining nuts 90 and 94.

Figure 15:
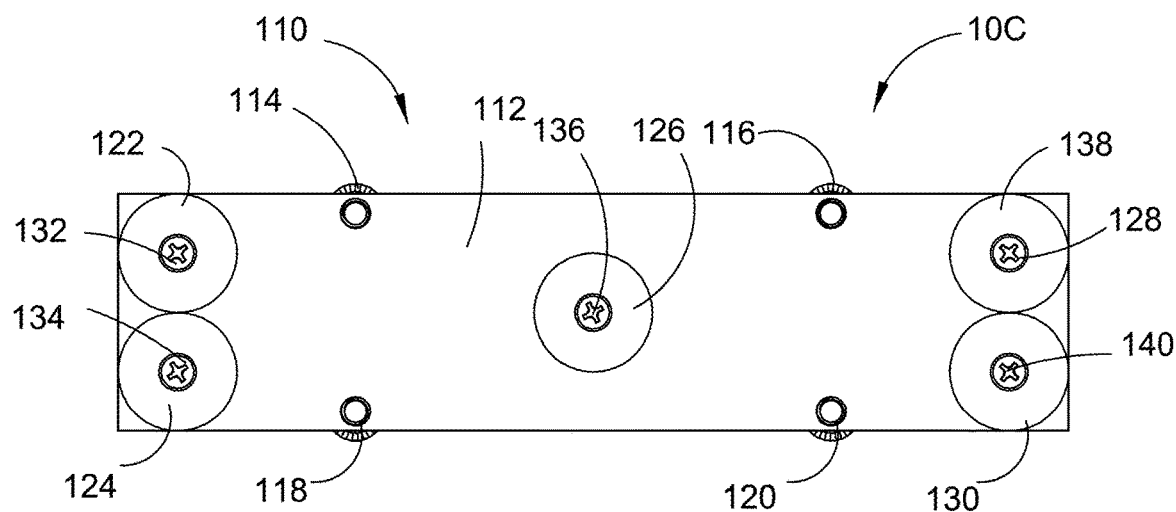
FIG. 15 depicts a bottom view of a curvature adjustable magnetic strut having five magnets affixed to the magnet base plate, and including four stabilizing bolts therein, according to the present invention.

FIG. 15 depicts a bottom view of another curvature adjustable magnetic strut embodiment 10C assembly 110 having five magnets 122, 124, 126, 128 and 130 affixed to the magnet base plate 112, and including four stabilizing bolts 114, 116, 118 and 120 therein, according to the present invention. Each of the five magnets 122, 124, 126, 128 and 130 are held in place on the magnet base plate 112 using magnet retaining screws 132, 134, 136, 138 and 140.

Figure 16:
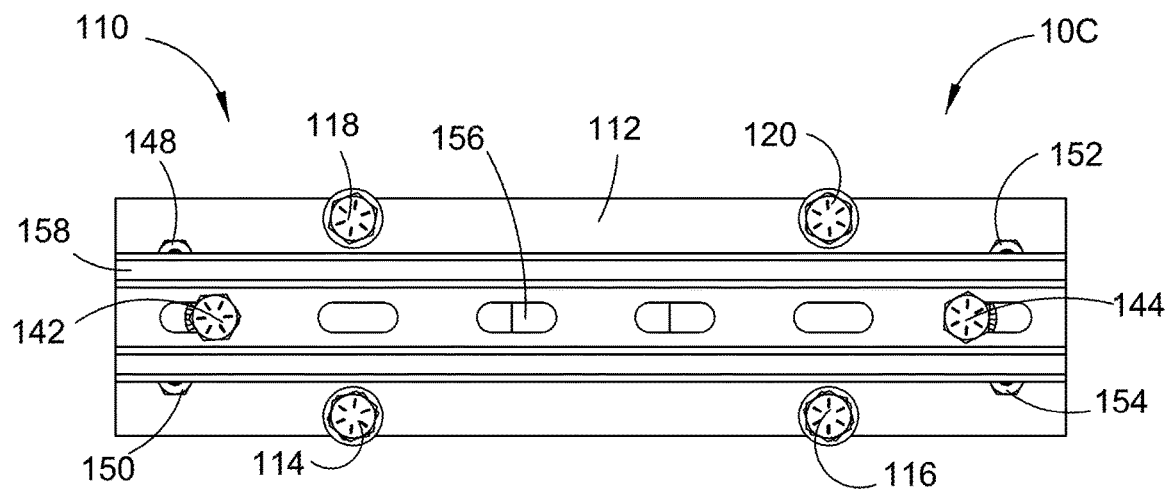
FIG. 16 depicts a top plan view of a curvature adjustable magnetic strut having five magnets affixed to the magnet base plate, and including four stabilizing bolts therein, according to the present invention.

FIG. 16 depicts a top plan view of the curvature adjustable magnetic strut embodiment 10C assembly 110 having five magnets (not seen in this view) affixed to the magnet base plate 112, and including four stabilizing bolts 114, 116, 118 and 120 therein, according to the present invention. This top plan view illustrates the slotted strut channel 158 and the middle connection block 156 spanning the slotted strut channel 158 and the magnet base plate 112. Also seen are the two curvature adjustment bolts 142 and 144 at each end of the slotted strut channel 158. Partially seen are four magnet retaining nuts 148, 150, 152 and 154.

Figure 17:
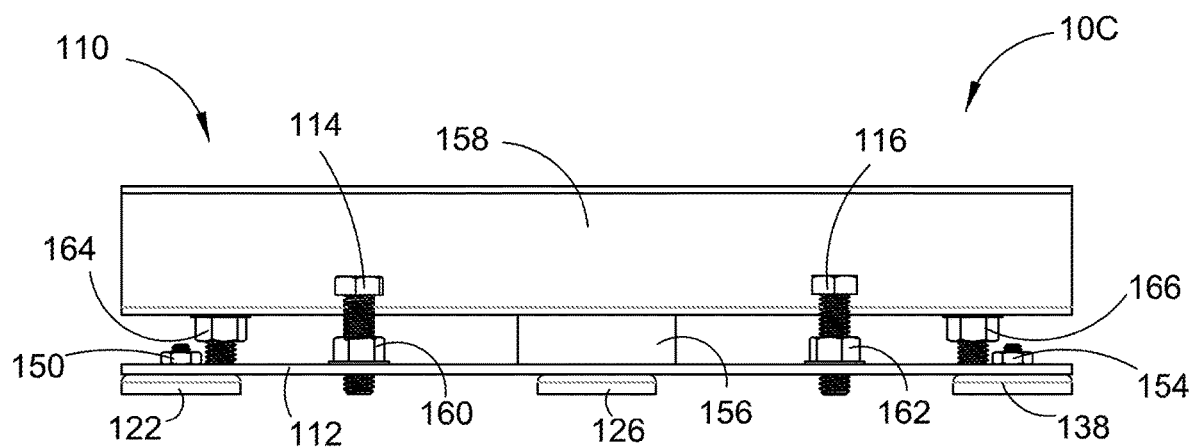
FIG. 17 depicts a side elevational view of a curvature adjustable magnetic strut having five magnets affixed to the magnet base plate, and including four stabilizing bolts therein, according to the present invention.

FIG. 17 depicts a side elevational view of the curvature adjustable magnetic strut embodiment 10C assembly 110 having five magnets with 122, 126 and 138 shown, affixed to the magnet base plate 112, and including four stabilizing bolts with 114 and 116 shown, having corresponding stabilizing nuts 160 and 162 shown here in this side view, according to the present invention. Also shown are the curvature adjustment nuts 164 and 166, as well as magnets 122, 126 and 138 and magnet retaining nuts 150 and 154.

FIG. 18 depicts a front view of the curvature adjustable magnetic strut embodiment 10C assembly 110 having five magnets with only 124 and 122 shown here, affixed to the magnet base plate 112 using magnet retaining nuts 148 and 150, respectively, and including stabilizing bolts 114 and 118 having stabilizing nuts 168 and 160 thereon, according to the present invention. Also seen here is curvature adjustment bolt 142 having curvature adjustment nut 164.

FIG. 19 depicts a rear view of the curvature adjustable magnetic strut embodiment 10C assembly 110 having five magnets affixed to the base plate, and including stabilizing bolts therein, according to the present invention. FIG. 19 is an opposite end view of FIG. 18 and shows two magnets 130 and 138 shown here, affixed to the magnet base plate 112 using magnet retaining nuts 152 and 154, respectively, and including stabilizing bolts 116 and 120 having stabilizing nuts 164 and 162 thereon, according to the present invention. Also seen here is curvature adjustment bolt 144 having curvature adjustment nut 166. As shown herein, the magnet base plate 112 remains flat as the curvature adjustment bolts 142 and 144 have not been tightened down to adjust the curvature of the magnet base plate 112.

FIG. 20 depicts a top, side and front perspective view of the curvature adjustable magnetic strut embodiment 10C assembly 110 having five magnets affixed to the base plate, here only three magnets 122, 124 and 138 are shown, and including stabilizing bolts 118 and 120 having stabilizing nuts 160 and 162 therein, according to the present invention. This view shows the relationship between the slotted strut channel 158, the middle connection block 156 and the magnet base plate 112.

FIG. 21 depicts a bottom, side and rear perspective view of the curvature adjustable magnetic strut embodiment 10C assembly 110 having five magnets 122, 124, 126, 130 and 138 affixed to the base plate 112 using magnet retaining screws 132, 134, 136, 128 and 140, respectively, and including four stabilizing bolts 114, 116, 118 and 120 therein, with only two showing 114 and 116 each having a stabilizing nut 168 and 164, affixed to the base plate 112, according to the present invention.

Figure 22:
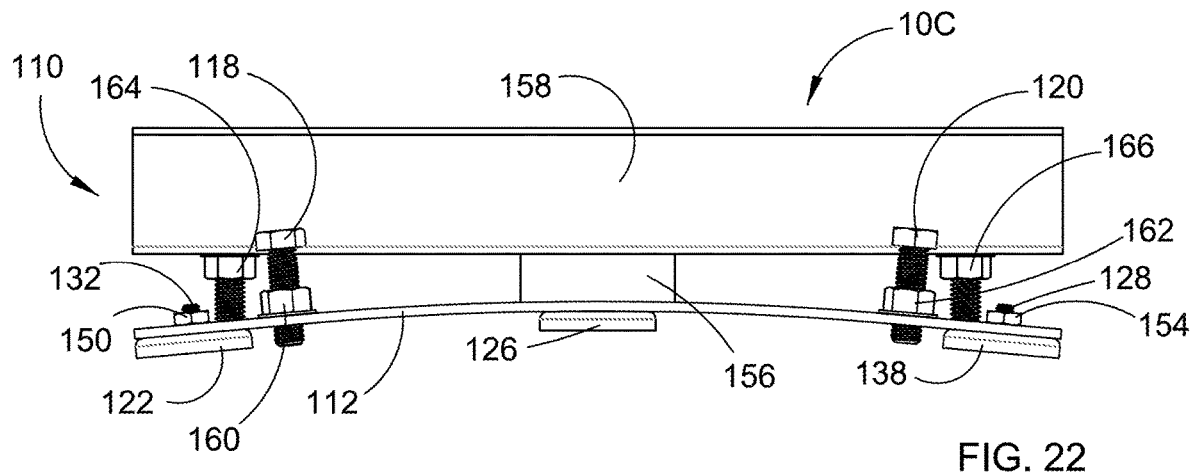
FIG. 22 depicts a side elevational view of a curvature adjustable magnetic strut having five magnets affixed to the magnet base plate, and including four stabilizing bolts therein, having the adjustment screws extended to adjust the curvature of the base plate, according to the present invention.

FIG. 22 depicts a side elevational view of the curvature adjustable magnetic strut embodiment 10C assembly 110 having five magnets, with three magnets 122, 126 and 138 shown, and having the curvature adjustment bolts 142 and 144 (not seen in this view) extended to adjust the curvature of the base plate 112, according to the present invention. When the curvature adjustment bolts are rotated they tighten down and press against magnet base plate 112 causing it to variably curve. Curvature adjustment nuts 164 and 166 are shown. Also shown are stabilization bolts 118 and 120 as well as corresponding stabilization nuts 160 and 162. In operation, after the curvature of the magnet base plate 112 is adjusted, the stabilizing bolts 118 and 120 are rotated such to make contact with the tank surface (not shown) to significantly stabilize the attachment of the assembly 110 to the tank 12.

Figure 23:
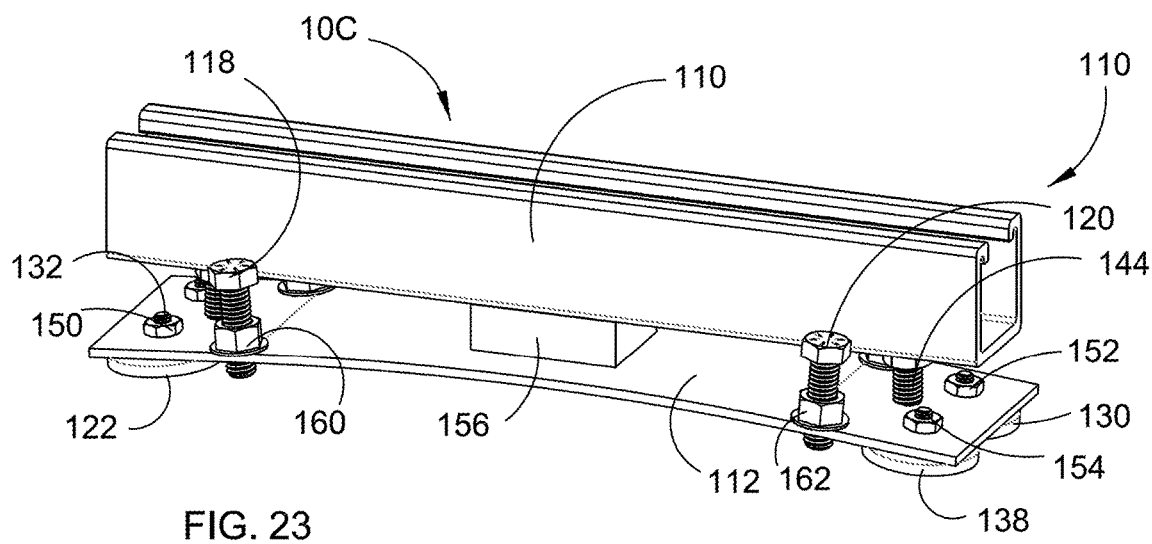
FIG. 23 depicts a top, side and rear perspective view of a curvature adjustable magnetic strut having five magnets affixed to the magnet base plate, and including four stabilizing bolts therein, having the adjustment screws extended to adjust the curvature of the base plate, according to the present invention.

FIG. 23 depicts a top, side and rear perspective view of the curvature adjustable magnetic strut embodiment 10C assembly 110 having five magnets (with only 122 and 138 shown) affixed to the base plate 112, and including four stabilizing bolts (with only 118 and 120 shown) therein, having the curvature adjustment bolts 142 and 144 (with only 144 shown) extended to adjust the curvature of the base plate 112, according to the present invention. The pressure of the curvature adjustment bolts 142 and 144 bearing down on the magnet base plate 112 causes the magnet base plate to bend and variably curve to closely parallel the curved surface of a vertical or horizontal cylindrical storage tank. In this way, piping, conduit and tubing can be quickly installed on virtually any curved surface of a vertical or horizontal cylindrical storage tank.

Figure 24:
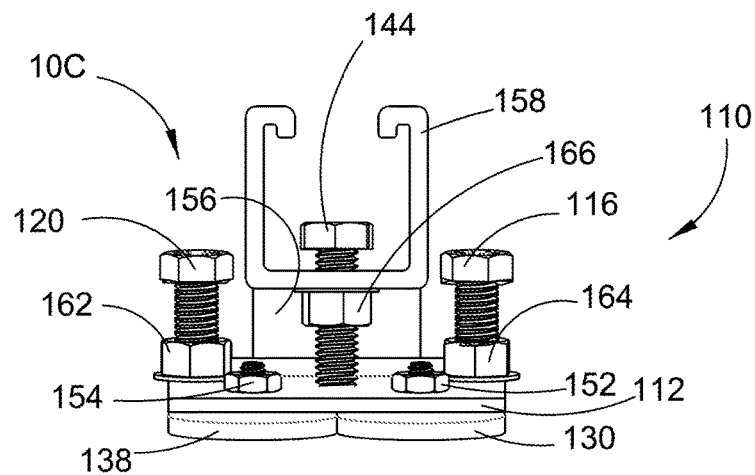
FIG. 24 depicts a front view of a curvature adjustable magnetic strut having five magnets affixed to the base magnet plate, and including four stabilizing bolts therein, having the adjustment screws extended to adjust the curvature of the base plate, according to the present invention.

FIG. 24 depicts a front view of the curvature adjustable magnetic strut embodiment 10C assembly 110 having five magnets (with only 130 and 138 shown) affixed to the base plate 112, and including four stabilizing bolts (with only 120 and 116 shown) therein, according to the present invention. Here the curvature adjustment bolt 144 has been rotated and tightened down to apply pressure to the magnet base plate 112. This downward rotation of the curvature adjustment bolt 144 is clearly evident when compared to its position in FIG. 19 (see above). The pressure applied causes the magnet base plate 112 to variably curve, depending on the extent of the curvature adjustment bolt 144 rotation and consequent downward movement. This allows for a curvature adjustment of the assembly 110 to attach securely to the curved surface of a fuel tank or the like.

Figure 25:
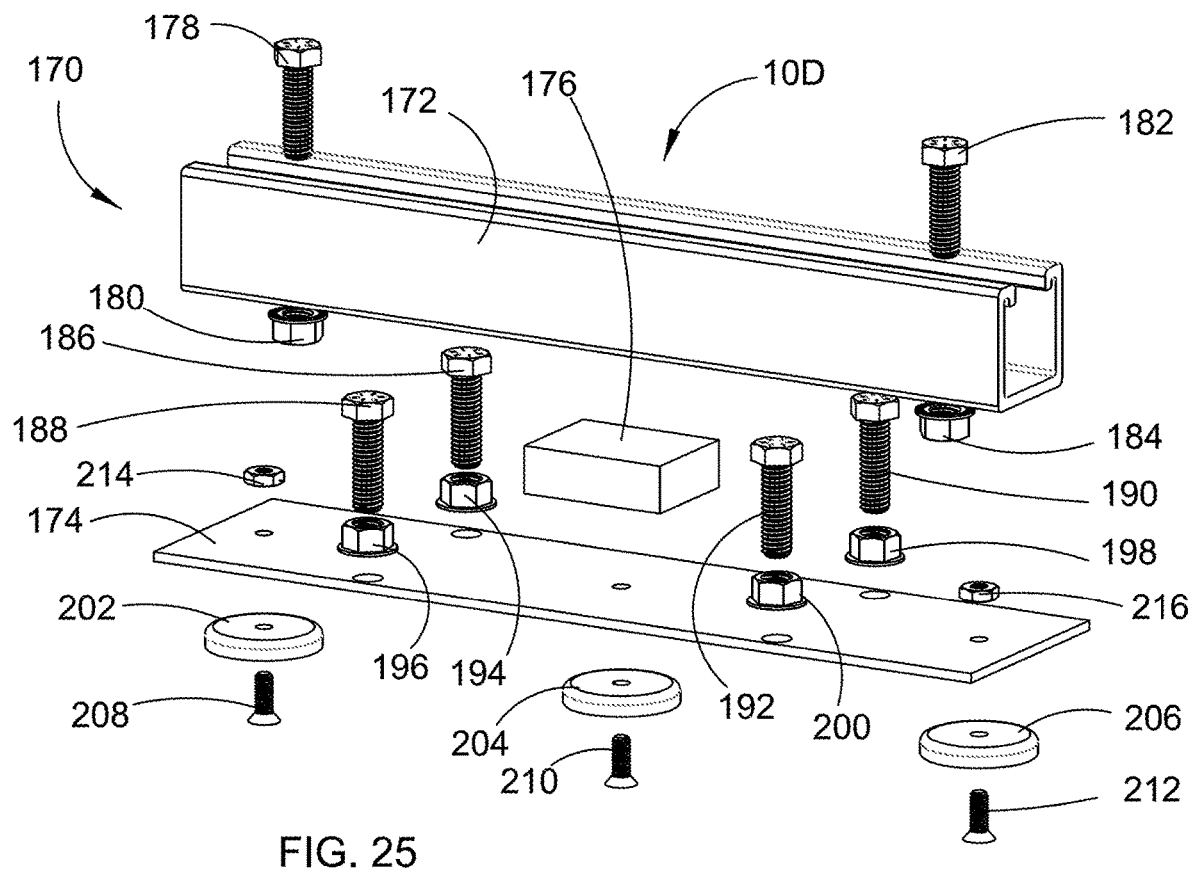
FIG. 25 depicts a top, side and rear perspective exploded view of a curvature adjustable magnetic strut having five magnets affixed to the magnet base plate, and including stabilizing bolts screws therein, according to the present invention.

FIG. 25 depicts a top, side and front exploded perspective view of another curvature adjustable magnetic strut embodiment 10D assembly 170 having three magnets 202, 204 and 206, and including four stabilizing bolts 186, 188, 190 and 192 having corresponding stabilizing nuts 194, 196, 198 and 200. This FIG. 25 shows the relationship between the slotted strut channel 172, the middle connection block 176 and the magnet base plate 174. It also illustrates the curvature adjustment bolts 178 and 182 having corresponding curvature adjustment nuts 180 and 184. Magnets 202 and 206 are secured to the magnet base plate 174 using magnet retaining screws 208 and 212 with corresponding magnet retaining nuts 214 and 216. This curvature adjustable magnetic strut embodiment 10D assembly 170 having three magnets 202, 204 and 206, and including four stabilizing bolts 186, 188, 190 and 192 exemplifies the possibility that each assembly may include 3 to 5 magnets and four or no stabilizing bolts, as with embodiments 10A, 10B and 10C (see FIGS. 3-24 above).

Figure 26:
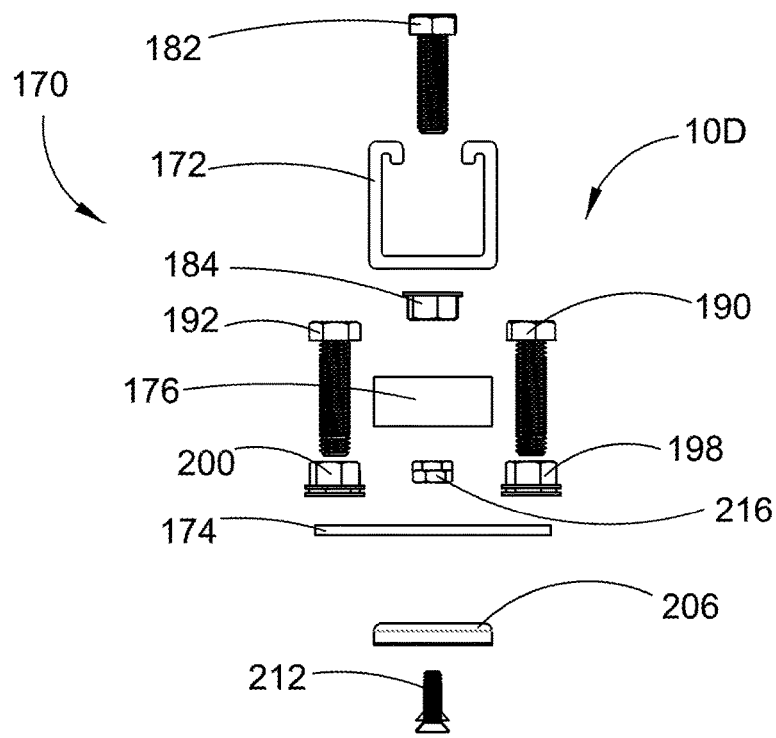
FIG. 26 depicts a front exploded view of a curvature adjustable magnetic strut having five magnets affixed to the magnet base plate, and including four stabilizing bolts therein.

FIG. 26 depicts a front exploded view of curvature adjustable magnetic strut embodiment 10D assembly 170 having three magnets (with only 206 shown) affixed to the base plate 174, and including four stabilizing bolts therein (with only 190 and 192 shown). Curvature adjustment bolt 182 passes through a slot in slotted strut channel 172 and is secured by curvature adjustment nut 184. Also shown in this exploded view, are two of the four stabilizing bolts 190 and 192, with corresponding stabilizing nuts 198 and 200. The stabilizing bolts pass through orifices in the magnet base plate 174 and then are tightened down to contact the tank surface to optimally stabilize the assembly when installed on the curved tank surface.

In summary, for the curvature adjustable magnetic strut assemblies 10A, 10B, 10C and 10D, these obvious variants of the present invention are constructed of a minimal number of components which consists of the following: 1) a 12"-24" piece of slotted strut channel; 2) a 1.5"×2"×½" rectangular piece of iron flat bar which is welded to the back of the unistrut in the center. Then welded to this flat iron bar is a 12"×⅛" piece of flat iron parallel to the unistrut with about a ½" gap between them. To the back of this will be three, four or five, or optionally up to six magnets affixed to it. Approximately 2" in from the ends adjustment bolts will run through the slotted strut channel on both ends and pressing against the back piece of flat iron. This curvature adjustment bolt is used to adjust the curvature of the flat iron magnet base such that the magnets thereon match in curvature to the curved surface it is being magnetically attached to, namely, the curved (or flat) fuel tank surface, whether that curvature be horizontal or vertical in nature. Once the desired placement is determined, the curvature adjustable magnetic strut assembly is set in place and the adjustment bolts are tightened down against the magnetic base plate until all magnets sit flat against the metal surface of the tank. One can then proceed with installing pipe, conduit, tubing, etc. The advantage is that the device can be installed with no tools other than a socket wrench and eliminates the need for welding and or drilling. This will save time and money, and in many cases (as with fuel tanks) will be a much safer option than welding. As described above in FIGS. 1-26, the number of magnets may be increased for heavier duty applications. The exact shape and size may vary. Magnet shape and size may also be variable, including but not limited to circular, rectangular and square magnets being employed, along with the use of rare earth magnets for high temp applications. Finally, these obvious variant embodiments are equally applicable for use on both curved and flat surfaces.

Figure 27:
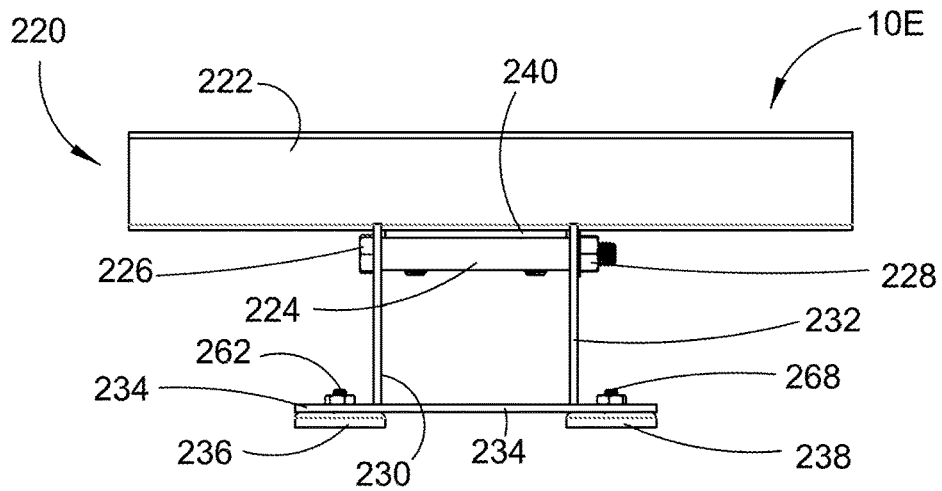
FIG. 27 depicts a side elevational view of a curvature adjustable magnetic strut having a securing plate having two hinged brackets attached to two base plates, wherein the curvature is adjusted by rotation of the two hinges to align the two base plates, each having two magnets.

FIG. 27 depicts a side elevational view of another embodiment of a curvature adjustable magnetic strut 10E assembly 220 having a strut channel securing plate 240 connected to the slotted strut channel 222 and spanning two single hinged bracket members (with here one bracket member is shown having bracket walls 230 and 232) attached to two magnet base plates (here one magnet base plate 234 is shown), wherein the curvature is adjusted by rotation of the two brackets about the two hinges (224 shown here) to align the two magnet base plates 234 and 235, each having two magnets (with only magnets 236 and 238 shown here). Hinge 224 has a hinge pin bolt 226 and a hinge pin nut 228.

Figure 28:
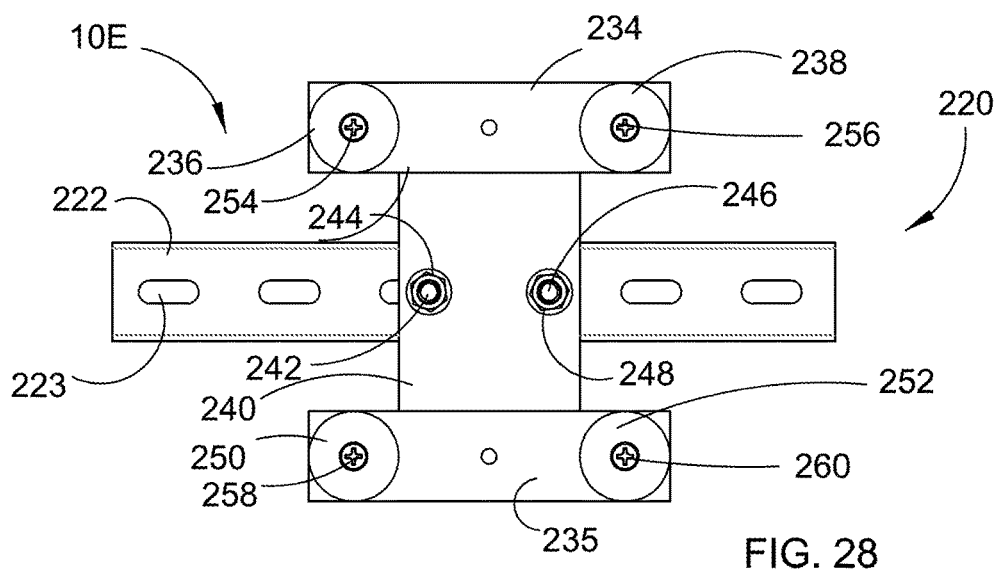
FIG. 28 depicts a bottom view of a curvature adjustable magnetic strut having a securing plate having two hinged brackets attached to two base plates, wherein the curvature is adjusted by rotation of the two hinges to align the two base plates, each having two magnets.

FIG. 28 depicts a bottom view of curvature adjustable magnetic strut embodiment 10E assembly 220 shown in FIG. 27. This assembly 220 includes a strut securing plate 240 having two single hinged brackets (not seen) attached to two magnet base plates 234 and 235, wherein the curvature is adjusted by rotation of the two hinges (not seen) to align the two base plates 234 and 235, each having two magnets 236, 238, 250 and 252 thereon. The strut securing plate 240 is affixed to the slotted strut channel using two securing bolts 244 and 246 (not seen, see FIG. 29) having corresponding securing bolts 244 and 246. Magnets 236, 238, 250 and 252 are held in place on the magnet base plates 234 and 235 using magnet retaining screws 254, 256, 258 and 260.

Figure 29:
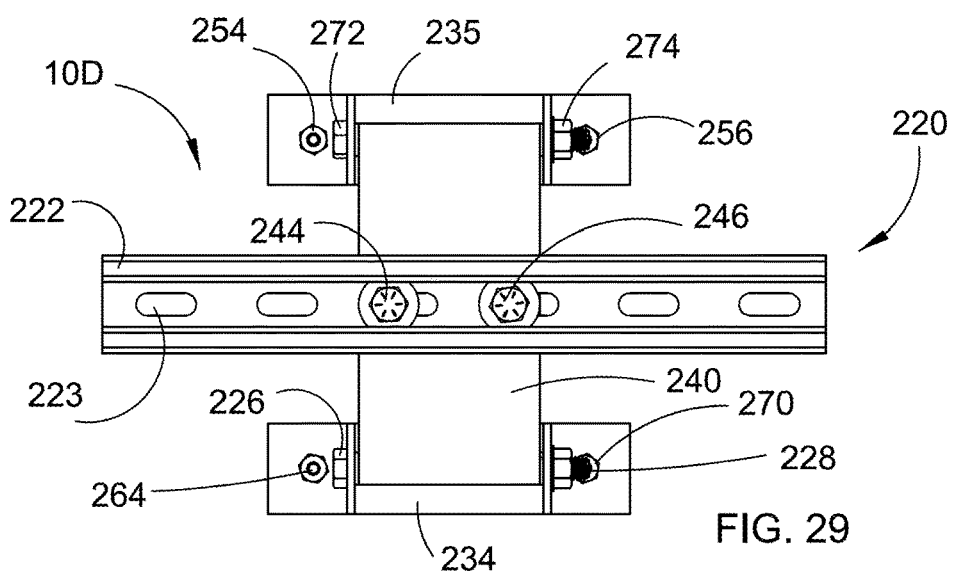
FIG. 29 depicts a top plan view of a curvature adjustable magnetic strut having a securing plate having two hinged brackets attached to two base plates, wherein the curvature is adjusted by rotation of the two hinges to align the two base plates, each having two magnets.

FIG. 29 depicts a top plan view of a curvature adjustable magnetic strut embodiment 10E assembly 220 having a strut securing plate 240 having two hinged brackets (not seen in this view, see FIG. 33 below) attached to two base plates 234 and 235, wherein the curvature is adjusted by rotation of the two brackets about the two hinges to align the two base plates, each having two magnets. This top view clearly shows the strut securing plate 240 and the two hinges being secured by hinge pin bolts 226 and 272, and corresponding hinge pin nuts 228 and 274, respectively. Additionally, this top view shows that the two strut securing bolts 244 and 246 each pass through a slot 223 in slotted strut channel 222 (also see FIGS. 30 and 31 below). Magnets (not seen in this view) are secured using magnet securing nuts 254, 256, 264 and 270.

FIG. 30 depicts a front view of a curvature adjustable magnetic strut embodiment 10E assembly 220 having a strut securing plate 240 having two hinged bracket hinges (not seen in this view, see FIG. 33 below) attached to two magnet base plates 234 and 235, wherein the curvature is adjusted by rotation of the two bracket assemblies having bracket walls 230, 232, 241 and 243 about the two hinges 224 and 276, to align the two magnet base plates 234 and 235, each having two magnets thereon, with magnets 238 and 250 seen in this FIG. 30 view. Also seen here are hinge pin retaining nuts 228 and 274. In this way, the magnet base plates adjust to the curvature of the surface of either a vertical or horizontal steel constructed fuel storage tank, by rotating about each hinge until the magnet base plates 234 and 235 are flush with the curvature of the tank. It is anticipated that strut securing plate 240 may be of variable length.

FIG. 31 depicts a rear view (the opposite view of FIG. 30 above) of a curvature adjustable magnetic strut embodiment 10E assembly 220 having a strut securing plate 240 spanning two hinged bracket assemblies attached to two magnet base plates 234 and 235, again wherein the curvature is adjusted by rotation of the two hinges to align the two magnetic base plates, each having two magnets thereon. The strut is secured to the strut securing plate 240 using strut securing bolt 242 and strut securing nut 246. Hinge pin blots 272 and 226 are visible here. Magnets 236 and 252 are secured to the magnet base plates 234 and 235 using magnet securing screws and nuts 254 and 260, respectively.

FIG. 32 depicts a top, side and front view of a curvature adjustable magnetic strut embodiment 10E assembly 220 having a strut securing plate 240 spanning two hinged bracket assemblies attached to two magnet base plates 234, shown here. This view clearly shows one of the two hinged bracket assemblies having bracket walls 230 and 232 attached to the strut securing plate 240 using hinge 224 having hinge pin bolt 226 and hinge pin nut 228 visible. Magnet base plate 234 includes two magnets 236 and 238 secured using magnet retaining screws 262 and 270 as well as magnet retaining nuts 254 and 268, respectively. Additionally, in this view, bracket assembly walls 241 and 243 are seen along with hinge retaining bolt 272 and hinge retaining nut 256, which secure the bracket assembly to the strut securing plate 240. The two bracket assemblies rotate about the hinges, wherein the curvature is adjusted by rotation of the two hinges to align the two magnet base plates to be flush with the curvature of the tank (not shown), with each of the two magnet base plates having two magnets thereon.

Figure 33:
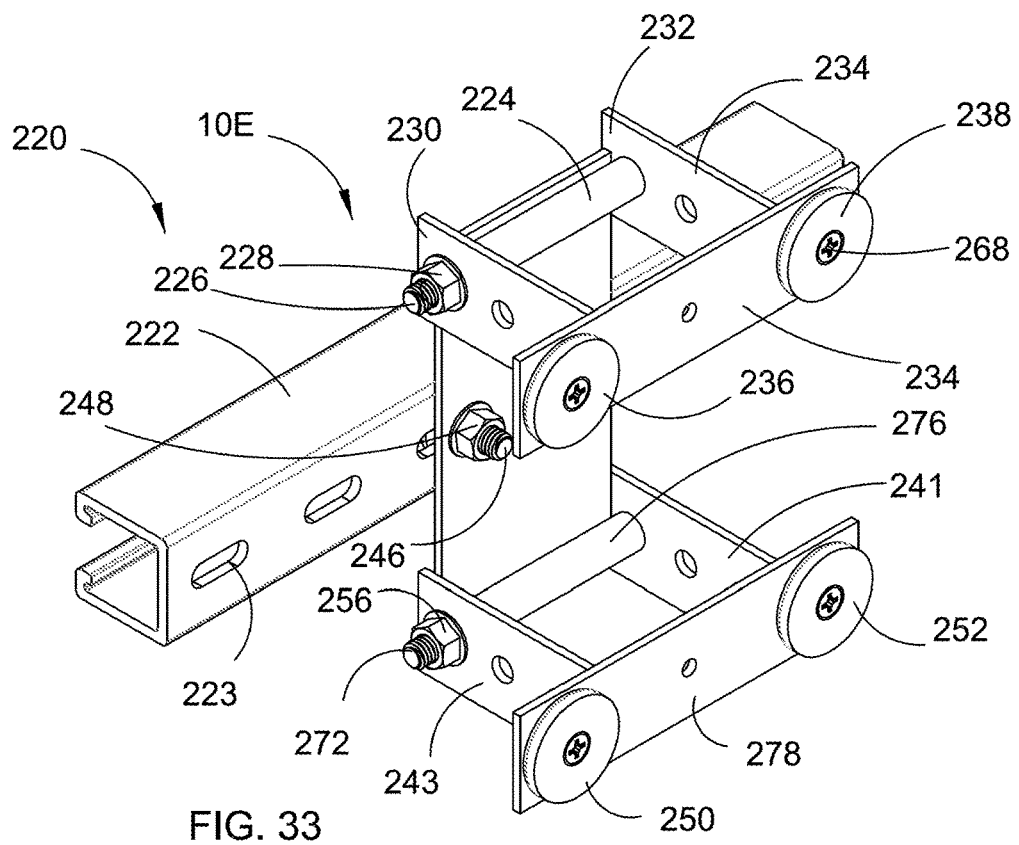
FIG. 33 depicts a bottom, side and front perspective view of a curvature adjustable magnetic strut having a securing plate having two hinged brackets attached to two base plates, wherein the curvature is adjusted by rotation of the two hinges to align the two base plates, each having two magnets.

FIG. 33 depicts a bottom, side and front view of a curvature adjustable magnetic strut embodiment 10E assembly 220 having a strut securing plate 240 spanning two hinged bracket assemblies attached to two magnet base plates 234, shown here. This view clearly shows both of the two hinged bracket assemblies having bracket walls 230 and 232, and 241 and 243 attached to the strut securing plate 240 using hinges 224 and 276 having hinge pin bolts 226 and 272 and hinge pin nuts 228 and 256 visible. Magnet base plates 234 and 235 both include two magnets each, 236 and 238, and 250 and 252 secured using magnet retaining screws 268, for example. Additionally, in this view, strut securing bolt 246 and strut securing nut 248 are seen, which secure the strut 222 to strut securing plate 240 which spans the two bracket assemblies. The two bracket assemblies rotate about the hinges, wherein the curvature is adjusted by rotation of the two hinges to align the two magnet base plates to be flush with the curvature of the tank (not shown), with each of the two magnet base plates having two magnets thereon.

Figure 34:
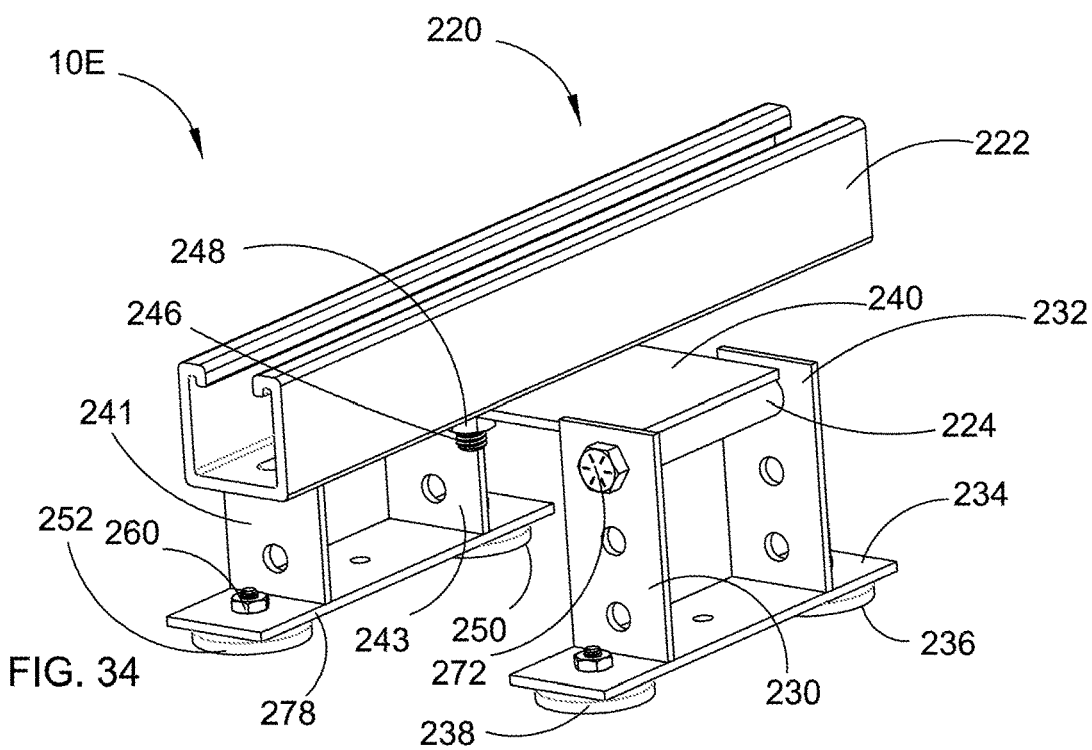
FIG. 34 depicts a top, side and rear perspective view of a curvature adjustable magnetic strut having a securing plate having two hinged brackets attached to two base plates, wherein the curvature is adjusted by rotation of the two hinges to align the two base plates, each having two magnets.

FIG. 34 depicts a top, side and rear view of a curvature adjustable magnetic strut embodiment 10E assembly 220 having a strut securing plate 240 having two hinged bracket assemblies having bracket walls 230 and 232, and 241 and 243 attached to the strut securing plate 240 using hinges 224 and 276 (with only 224 visible here) having hinge pin retaining bolts 226 and 272 (with only 272 visible here) and hinge pin retaining nuts 228 and 256 with neither visible. The hinged bracket assemblies are attached to the two magnet base plates, wherein the curvature is adjusted by rotation of the two hinges to align the two base plates, each having two magnets.

Figure 35:
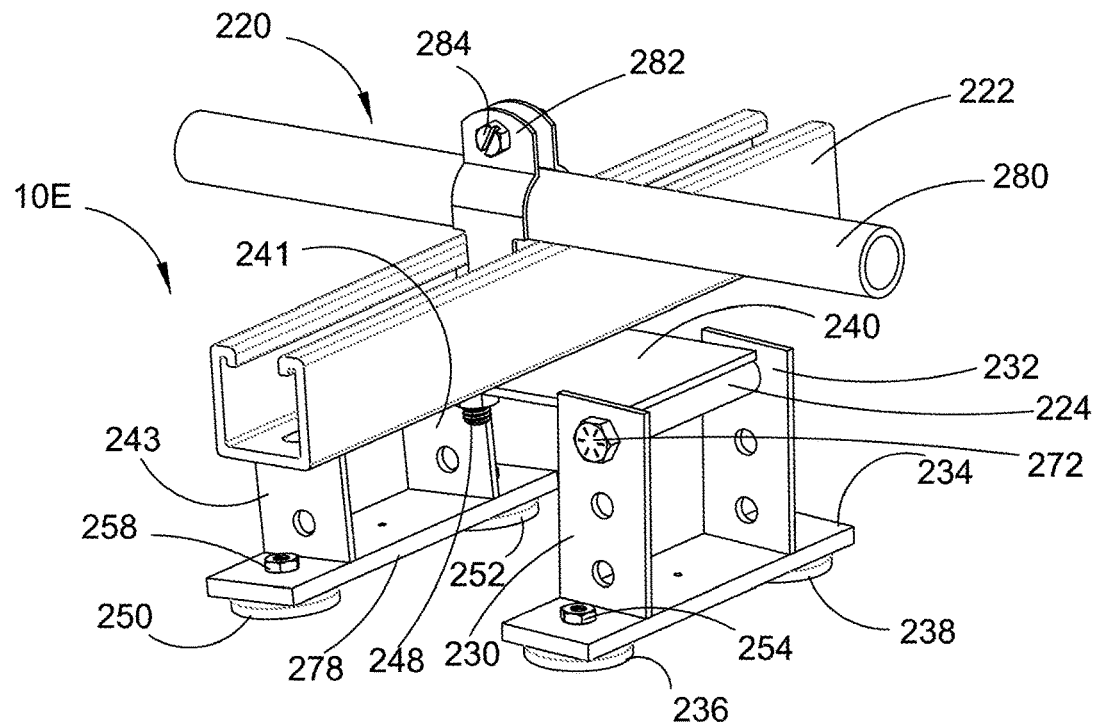
FIG. 35 depicts a top, side and rear perspective view of a curvature adjustable magnetic strut having a securing plate having two hinged brackets attached to two base plates, wherein the curvature is adjusted by rotation of the two hinges to align the two base plates, each having two magnets, shown having a pipe, conduit or tubing securely mounted to the strut with a clamp.

FIG. 35 depicts a top, side and rear view of a curvature adjustable magnetic strut embodiment 10E assembly 220 having a securing plate 240 having two hinged bracket assemblies attached to two magnet base plates 234 and 278, wherein the curvature is adjusted by rotation of the two hinges (with hinge 224 shown here) to align the two magnet base plates 234 and 278, each having two magnets 236 and 238 and 250 and 252 thereon. Here in FIG. 35, the curvature adjustable magnetic strut embodiment 10E assembly 220 is shown in use having a pipe, conduit or tubing 280 securely mounted to the curvature adjustable magnetic strut embodiment 10E assembly 220 with a conventional pipe clamp 282 and clamp retaining bolt and nut 284.

Figure 36:
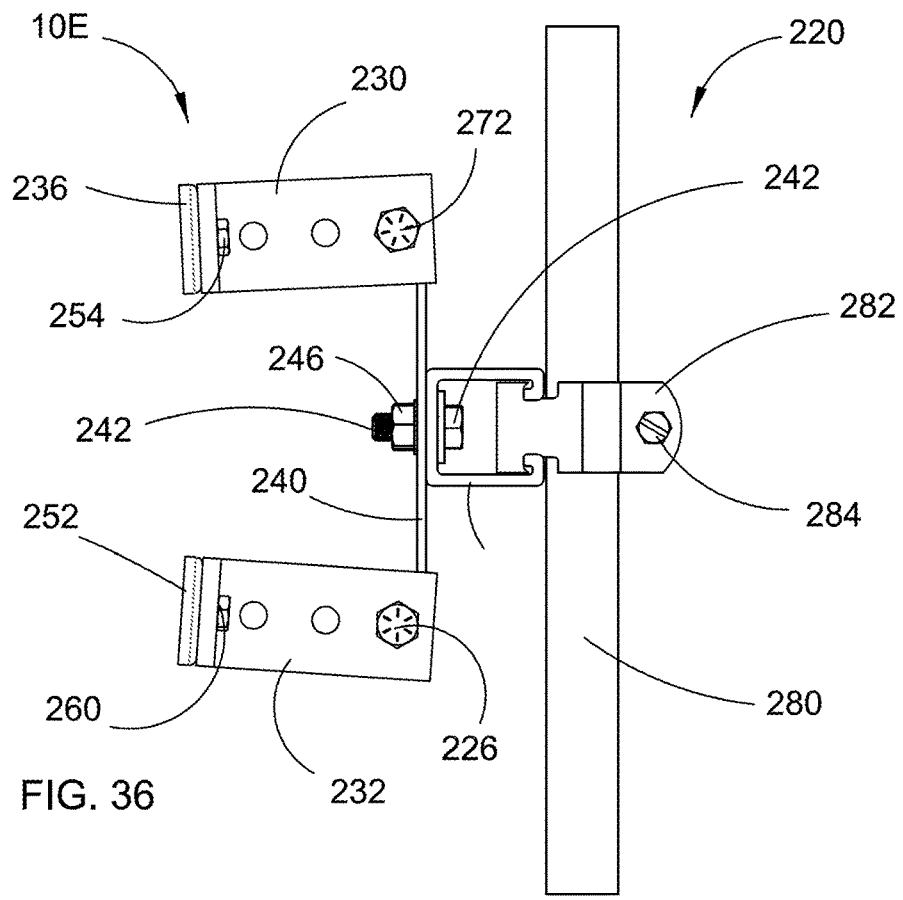
FIG. 36 depicts a rear view of a curvature adjustable magnetic strut having a securing plate having two hinged brackets attached to two base plates, wherein the curvature is adjusted by rotation of the two hinges to align the two base plates, each having two magnets, shown having a pipe, conduit or tubing securely mounted to the strut with a clamp.

FIG. 36 depicts a rear view of a curvature adjustable magnetic strut embodiment 10E assembly 220 having a strut securing plate 240 having two hinged bracket assemblies attached to two magnet base plates 234 and 278, wherein the curvature is adjusted by rotation of the two hinges (with hinge 224 shown here) to align the two magnet base plates 234 and 278, each having two magnets 236 and 238 and 250 and 252 thereon. Here in FIG. 36, the curvature adjustable magnetic strut embodiment 10E assembly 220 is shown in use having a pipe, conduit or tubing 280 securely mounted to the curvature adjustable magnetic strut embodiment 10E assembly 220 with a conventional pipe clamp 282 and clamp retaining bolt and nut 284. Additionally, the two hinged bracket assemblies have been rotated slight inward to conform to the curvature of a tank surface, as seen in this view.

Figure 37:
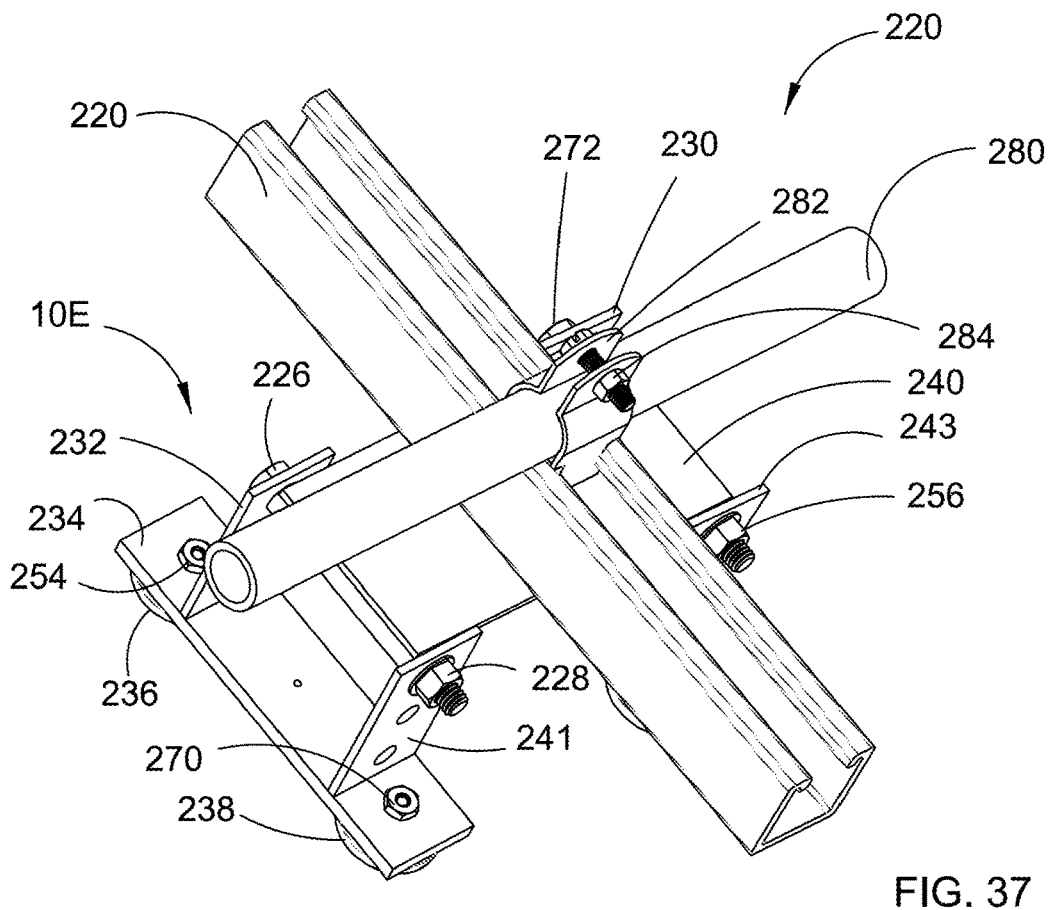
FIG. 37 depicts a top, side and front perspective view of a curvature adjustable magnetic strut having a securing plate having two hinged brackets attached to two base plates, wherein the curvature is adjusted by rotation of the two hinges to align the two base plates, each having two magnets, shown having a pipe, conduit or tubing securely mounted to the strut with a clamp.

FIG. 37 depicts a top, side and front view of a curvature adjustable magnetic strut embodiment 10E assembly 220 having a strut securing plate 240 having two hinged bracket assemblies attached to two magnet base plates 234 and 278, wherein the curvature is adjusted by rotation of the two hinges (with hinge 224 shown here) to align the two magnet base plates 234 and 278, each having two magnets 236 and 238 and 250 and 252 thereon. Here in FIG. 36, the curvature adjustable magnetic strut embodiment 10E assembly 220 is shown in use having a pipe, conduit or tubing 280 securely mounted to the curvature adjustable magnetic strut embodiment 10E assembly 220 with a conventional pipe clamp 282 and clamp retaining bolt and nut 284. Additionally, the two hinged bracket assemblies have been rotated slight inward to conform to the curvature of a tank surface, as seen in this view.

Figure 38:
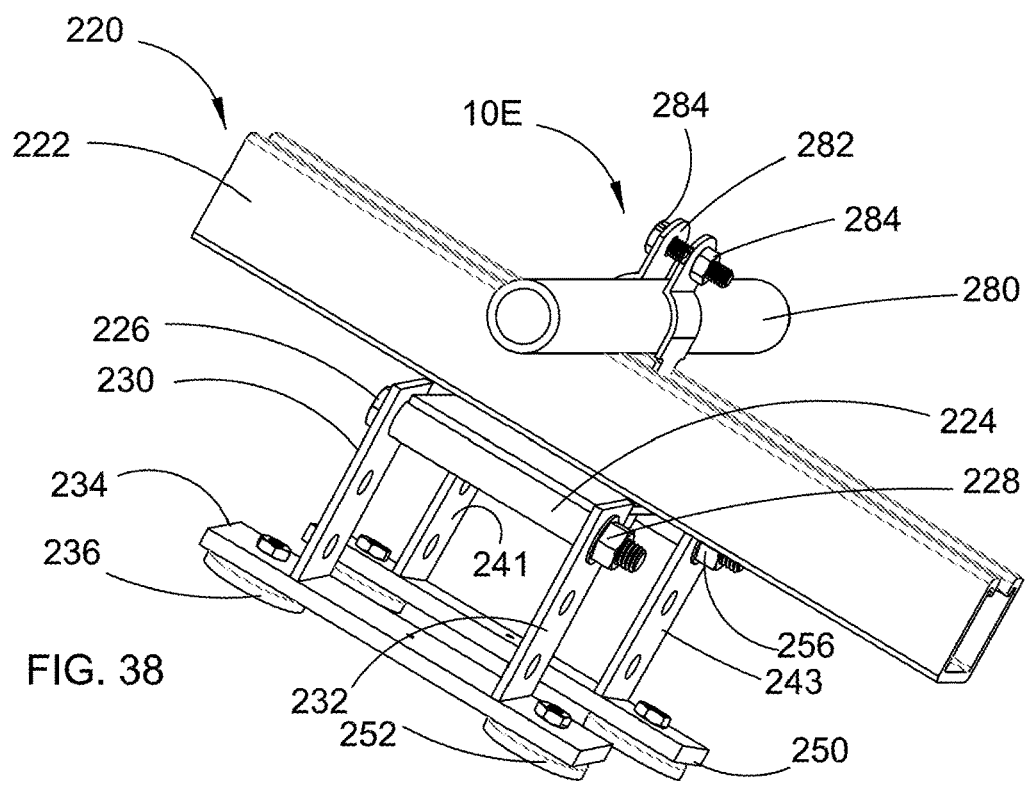
FIG. 38 depicts a top, side and front perspective view of a curvature adjustable magnetic strut having a securing plate having two hinged brackets attached to two base plates, wherein the curvature is adjusted by rotation of the two hinges to align the two base plates, each having two magnets, shown having a pipe, conduit or tubing securely mounted to the strut with a clamp.

FIG. 38 depicts a top, side and front view of a curvature adjustable magnetic strut embodiment 10E assembly 220 having a securing plate 240 having two hinged bracket assemblies attached to two magnet base plates 234 and 278, wherein the curvature is adjusted by rotation of the two hinges (with hinge 224 shown here) to align the two magnet base plates 234 and 278, each having two magnets 236 and 238 and 250 and 252 thereon. Here in FIG. 35, the curvature adjustable magnetic strut embodiment 10E assembly 220 is shown in use having a pipe, conduit or tubing 280 securely mounted to the curvature adjustable magnetic strut embodiment 10E assembly 220 with a conventional pipe clamp 282 and clamp retaining bolt and nut 284. Additionally, the two hinged bracket assemblies have been rotated slight inward to conform to the curvature of a tank surface, as seen in this view.

FIG. 39 depicts a side elevational view of a curvature adjustable magnetic strut embodiment 10F assembly 300 having a strut 302 secured to four hinged bracket assemblies 304, 328, 338 and 316, attached to four magnet base plates 306, 330, 340 and 318, respectively, wherein the curvature is adjusted by rotation of the four hinged bracket assemblies to align the four magnet base plates, with each magnet base plate having two magnets thereon. Each of the hinged bracket assemblies 304, 328, 338 and 316 is secured to the variable length slotted strut 302 using eight strut retaining bolts 312, 314, 334, 336, 344, 346, 324 and 326. The two end bracket assemblies 304 and 316 each have two hinges, 354 and 380 (not seen here, see FIG. 41 and FIG. 42) with hinge retaining pin bolts 308 and 310 on bracket assembly 304, and with hinge retaining pin nuts 320 and 322 on bracket assembly 316. The intermediary bracket assemblies 328 and 338 are positioned toward the middle of the slotted strut 302 and each have one hinge, 362 and 364 (not seen here see FIG. 41) namely, hinge retaining pin nut 332 and hinge retaining pin nut 342. On the two ending bracket assemblies 304 and 316, one hinge 310 and 322 is proximal to the slotted strut 302 and the other hinge 308 and 320 is proximal to the magnet base plate 306. With the intermediary bracket assemblies 328 and 338 the hinges, 362 and 364, respectively, are positioned proximal to the slotted strut 302 only. In this way, each of the ending bracket assemblies are two-way adjustable by rotation around each of the two hinges, while the intermediary bracket assemblies are one-way adjustable by rotation about the single hinge positioned near the slotted strut 302.

FIG. 40 depicts a top plan view of a curvature adjustable magnetic strut embodiment 10F assembly 300 having a strut 302 secured to four hinged bracket assemblies 304, 328, 338 and 316, attached to four magnet base plates 306, 330, 340 and 318, respectively, wherein the curvature is adjusted by rotation of the four hinged bracket assemblies to align the four magnet base plates, with each magnet base plate having two magnets thereon. Here in FIG. 40, the bracket retaining bolts 312, 314, 334, 336, 344, 346, 324 and 326 are clearly seen securing the bracket assemblies to the slotted strut 304. Also shown, are the four magnet base plates 306, 330, 340 and 318. The positioning of the hinges attached to the four bracket assemblies allows for curvature adjustment of the four brackets attached to the four magnet base plates, wherein the curvature is adjusted by rotation of the four upper hinges and two lower hinges (attached to the end brackets only) to align the magnet four base plates, with each magnet base plate having two magnets thereon.

Figure 41:
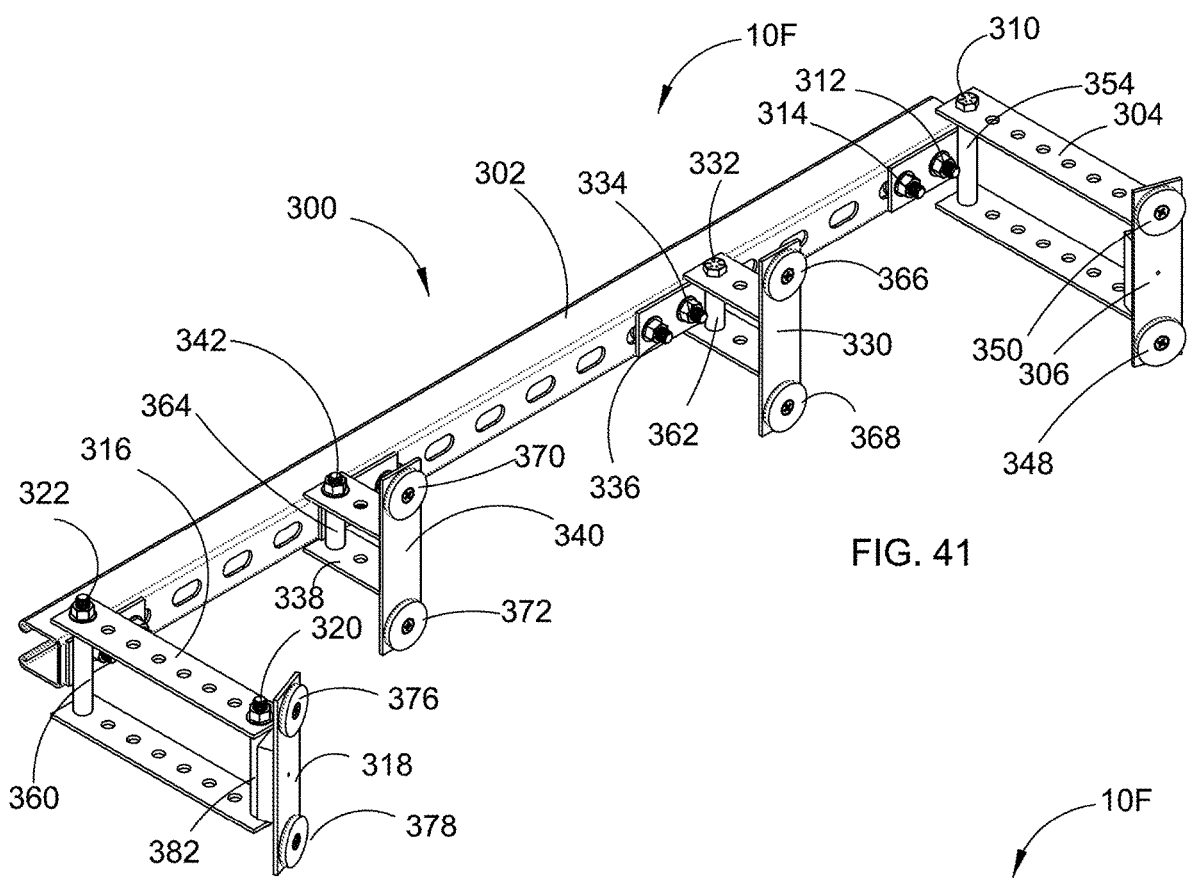
FIG. 41 depicts a bottom, side and front perspective view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 41 depicts a bottom, side and front view of a curvature adjustable magnetic strut embodiment 10F assembly 300 having a strut 302 secured to four hinged bracket assemblies 304, 328, 338 and 316, attached to four magnet base plates 306, 330, 340 and 318, respectively. Here is shown the position of the hinges 354 and 380 on bracket 304, hinges 360 and 282 on end bracket 316, as well as hinge 362 on bracket 328 and hinge 364 on bracket 338. In this view, the magnet base plates 306 and 318 on end brackets 304 and 316, respectively, have been rotated inward to adjust for the curvature of a fuel tank surface. Therefore, by rotation of the brackets and magnet base plates, the curvature adjustable magnetic strut embodiment 10F assembly 300 is readily adjusted for varying curvature for a secure attachment to a fuel tank curved surface.

Figure 42:
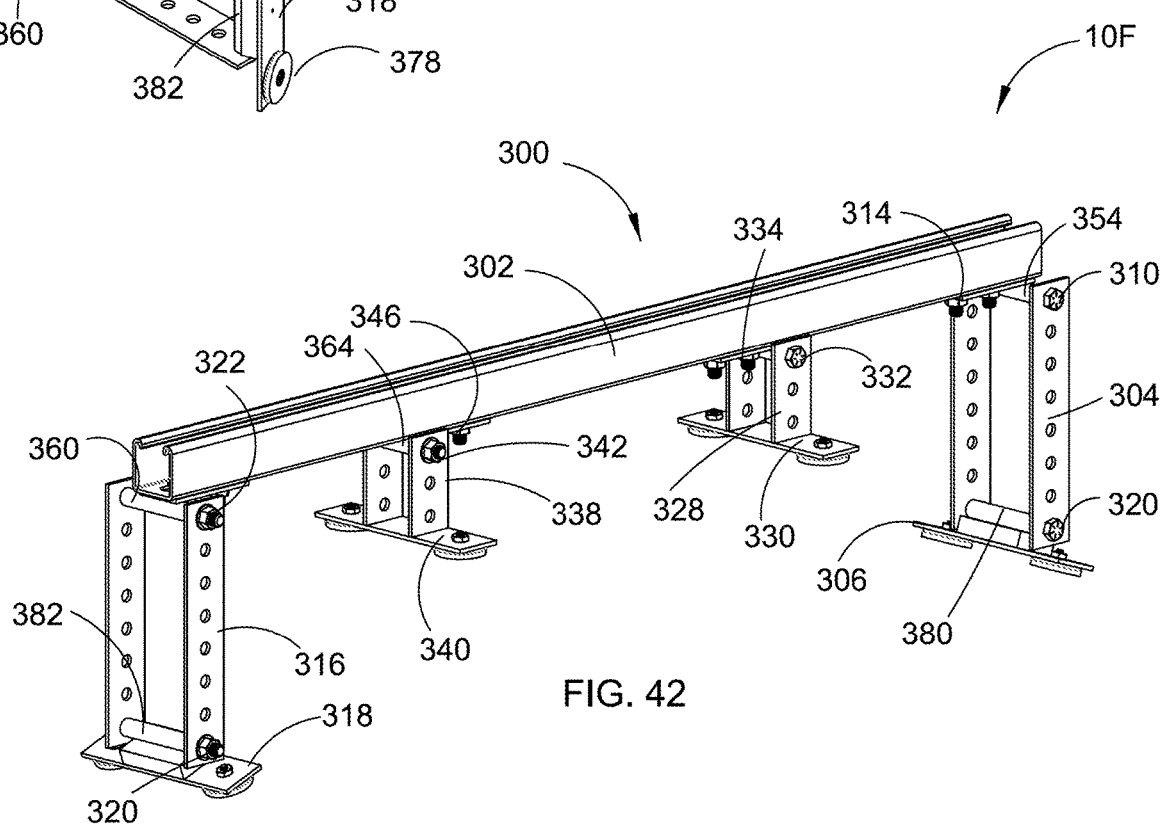
FIG. 42 depicts a top, side and front perspective view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 42 depicts a top, side and front view of a curvature adjustable magnetic strut embodiment 10F assembly 300 having a strut 302 secured to four hinged bracket assemblies 304, 328, 338 and 316, attached to four magnet base plates 306, 330, 340 and 318, respectively This FIG. 42 view clearly shows the position of the end bracket hinges, namely, hinges 354 and 380 on bracket assembly 304, and hinges 360 and 382 on bracket assembly 316.

Figure 43:
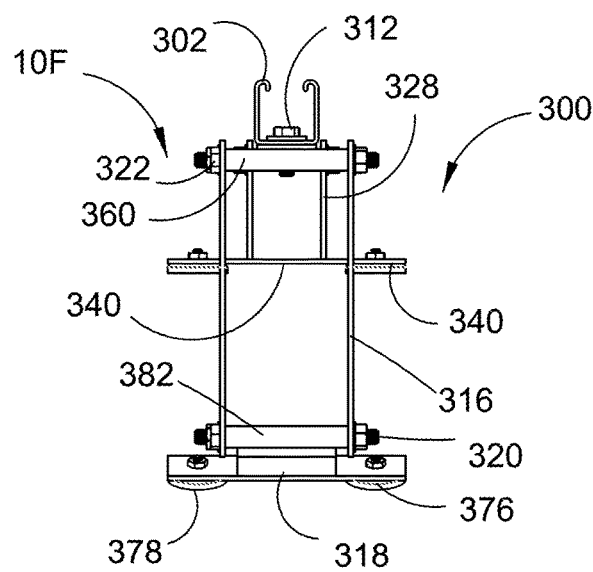
FIG. 43 depicts a front view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 43 depicts a front view of a curvature adjustable magnetic strut embodiment 10F assembly 300 having a strut 302 secured to four hinged bracket assemblies 304, 328, 338 and 316, attached to four magnet base plates 306, 330, 340 and 318, respectively, with only two bracket assemblies 316 and 328 visible. The strut 302 is secured to bracket assembly 316 using strut retaining bolt 312 and 314 (314 not seen here), and bracket 328 using securing bolt 334 and 336 (both not seen here). The location of hinges 360 and 382 is shown. Hinge 360 allows rotation of the bracket assembly 316, while hinge 382 allows rotation of magnet base plate 318. In this way, curvature adjustment of the entire assembly 300 is enabled.

Figure 44:
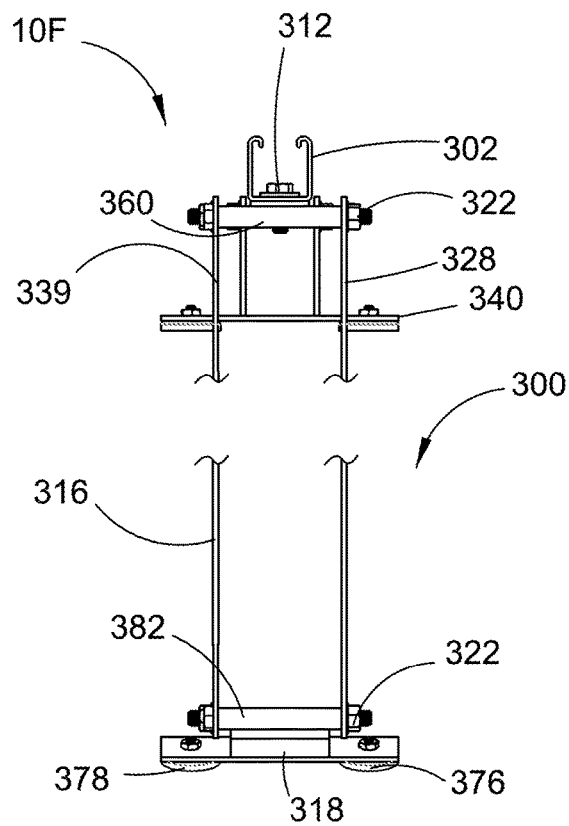
FIG. 44 depicts a rear view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets and exemplifying that the brackets may be a varying length.

FIG. 44 depicts a rear view of a curvature adjustable magnetic strut embodiment 10F assembly 300 having a strut 302 secured to four hinged bracket assemblies 304, 328, 338 and 316, attached to four magnet base plates 306, 330, 340 and 318, respectively with only two bracket assemblies 316 and 328 visible. This FIG. 44 view illustrates that the bracket assemblies may be constructed of varying lengths as required to adjust the assemblies 300 to the curvature of fuel tanks in order to allow a secure attachment of the magnets to the tank surface.

Figure 45:
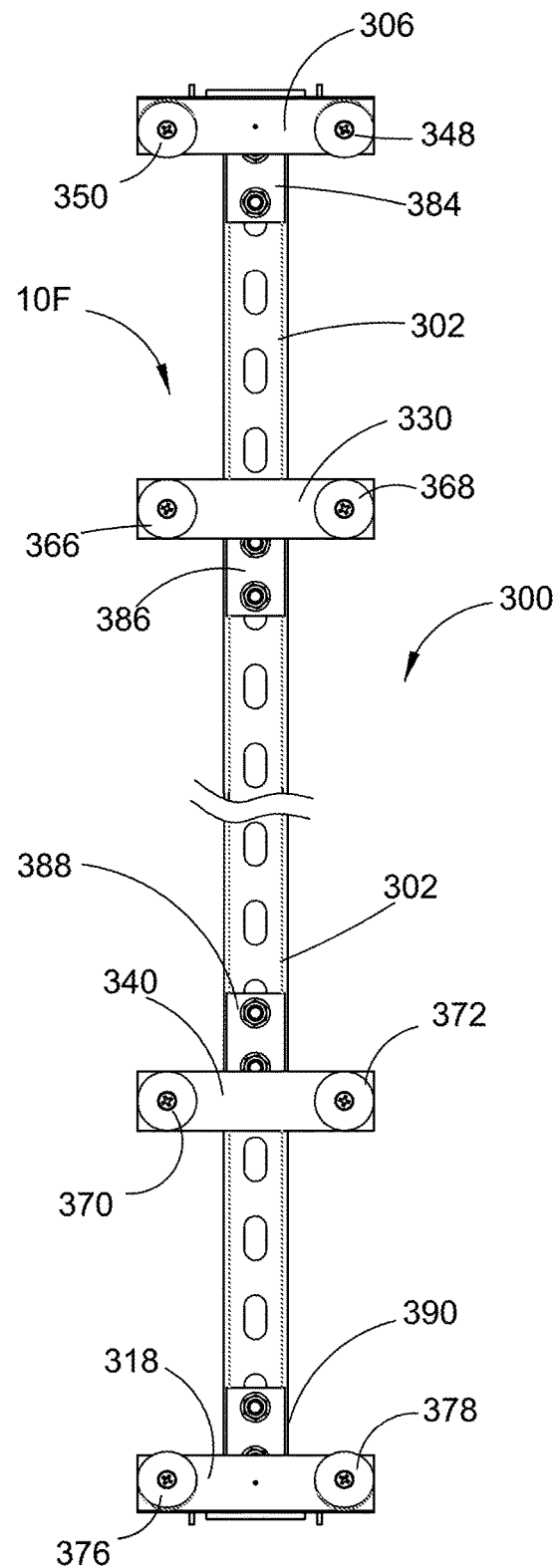
FIG. 45 depicts a bottom view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets and exemplifying that the strut may be a varying length.

FIG. 45 depicts a bottom view of a curvature adjustable magnetic strut embodiment 10F assembly 300 having strut 302 secured to four hinged bracket assemblies 304, 328, 338 and 316 (not shown), attached to four magnet base plates 306, 330, 340 and 318, respectively. Each magnet base plate has two magnets thereon, with magnet base plate 306 having magnets 348 and 350, magnet base plate 330 having magnets 366 and 368, magnet base plate 340 having magnets 370 and 372, while magnet base plate 318 includes magnets 376 and 378. Also shown are the securing plates 384, 386, 388 and 390 which secure the slotted strut 302 to each bracket assembly 304, 328, 338 and 316 (not shown) using the strut retaining bolts 312, 314, 334, 336, 344, 346, 324 and 326 (not labeled here, see FIG. 40). This FIG. 45 view illustrates that the slotted strut 302 assemblies 300 may be constructed of varying lengths as required to adjust the assemblies 300 to the curvature of fuel tanks in order to allow a secure attachment of the magnets to the tank surface. It is anticipated that the lengths of the slotted struts 302 may be varied depending upon the number of pipes, conduits and tubing to be mounted to the assemblies 300 as required by the installation of the adjustable magnetic strut embodiment 10F.

Figure 46:
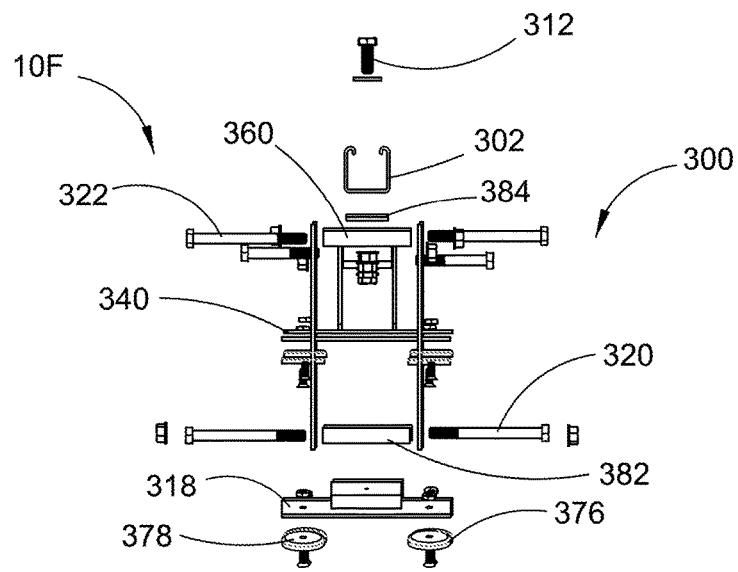
FIG. 46 depicts a front exploded view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 46 depicts a front exploded view of a curvature adjustable magnetic strut embodiment 10F assembly 300 illustrating the various parts making up the construction of the assembly 300. The relative locations of hinges 360 and 382 is shown, along with the magnet base plates 340 and 318, and magnets 376 and 378 when affixed to magnet base plate 318. Hinge retaining bolts 320 and 322 act to secure the hinges 360 and 382 to the bracket assemblies. Strut retaining bolt 312 acts to secure the strut 302 to the bracket assemblies using securing plate 384 (see FIG. 45).

Figure 47:
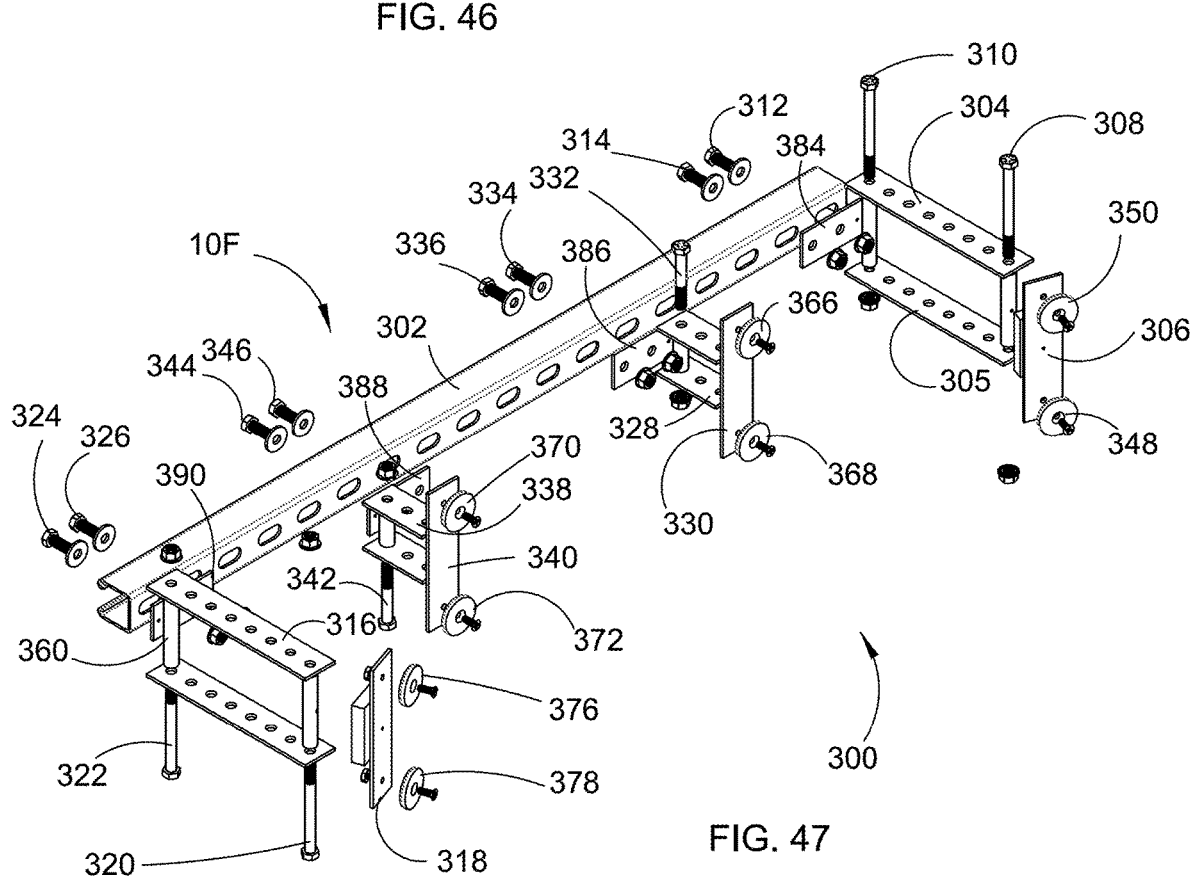
FIG. 47 depicts a bottom, side and front perspective exploded view of a curvature adjustable magnetic strut having four securing plates having four hinged brackets, with both single hinged and double hinged bracket assemblies attached to four base plates, wherein the curvature is adjusted by rotation of the four hinges to align the four base plates, with each base plate having two magnets.

FIG. 47 depicts a bottom, side and front exploded view of a curvature adjustable magnetic strut embodiment 10F assembly 300 illustrating the position of the strut securing plates 384, 386, 388 and 390 acting to secure the bracket assemblies 304, 328, 338 and 316 to the slotted strut 302 using strut securing bolts 312, 314, 334, 336, 344, 346, 324 and 326. Each of the bracket assemblies 304, 328, 338 and 316 include a magnet base plate having two magnets affixed thereto, with magnets 348 and 350 affixed to magnet base plate 306, magnets 366 and 368 affixed to magnet base plate 330, magnets 370 and 372 affixed to magnet base plate 340, and magnets 376 and 378 affixed to magnet base plate 318. In addition, hinge pin retaining bolts 310 and 312 are positioned on bracket assembly 304, hinge pin retaining bolt 332 on bracket assembly 328, hinge pin retaining bolt 342 on bracket assembly 338, and hinge pin retaining bolts 320 and 322 on bracket assembly 316.

Figure 48:
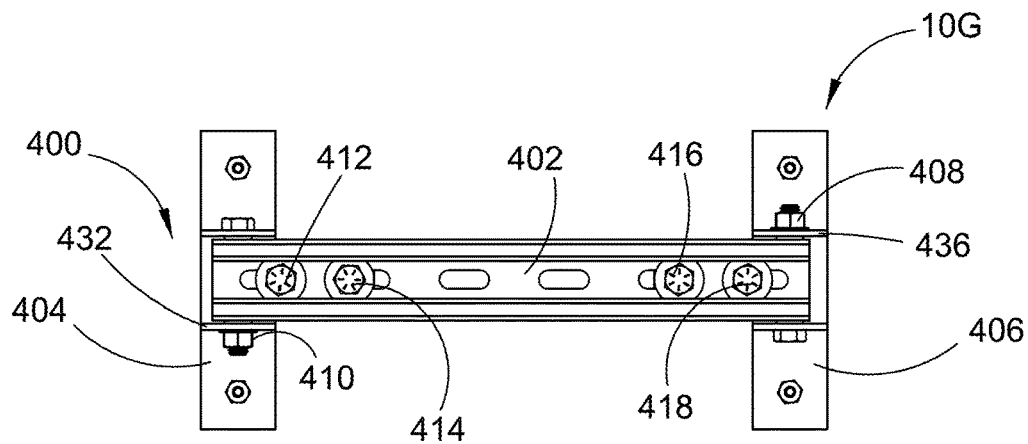
FIG. 48 depicts a top plan view of a curvature adjustable magnetic strut having two strut base plates securing two hinged brackets one on each end of the strut, wherein the hinged brackets each have a base plate including one or more magnets, here having two magnets per base plate.

FIG. 48 depicts a top plan view of a curvature adjustable magnetic strut embodiment 10G assembly 400 having two single hinged bracket assemblies 432 and 436 affixed to a slotted strut 402 using strut retaining bolts 412, 414, 416 and 418. At the end of each bracket assembly is located a magnet base plate 404 and 406. Each of the hinges (not seen here) positioned on each of the hinged bracket assemblies is secured using a hinge pin bolt 408 and 410. Each of the magnetic base plates 404 and 406 include one or more magnets affixed thereto, see FIG. 49 below.

Figure 49:
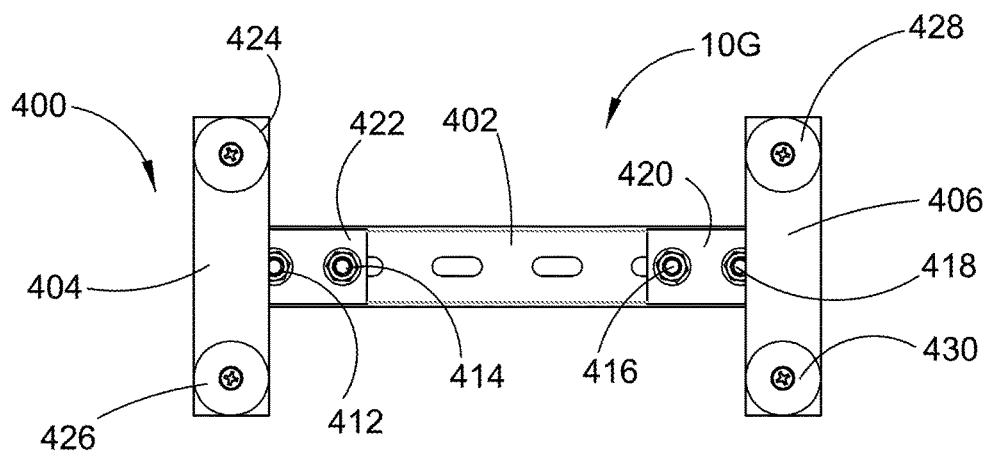
FIG. 49 depicts a bottom view a curvature adjustable magnetic strut having two strut base plates securing two hinged brackets one on each end of the strut, wherein the hinged brackets each have a base plate including one or more magnets, here having two magnets per base plate.

FIG. 49 depicts a bottom view a curvature adjustable magnetic strut embodiment 10G assembly 400 having two single hinged bracket assemblies 432 and 436 affixed to a slotted strut 402 using strut retaining bolts 412, 414, 416 and 418. At the end of each bracket assembly is located a magnet base plate 404 and 406. The slotted strut 402 is secured to two bracket assembly securing plates 420 and 422 which are bolted in place using strut retaining bolts 412, 414, 416 and 418. As illustrated here in FIG. 49, each magnet base plate 404 and 406 have two magnets affixed thereto, magnets 424, 426, 428 and 430, respectively.

Figure 50:
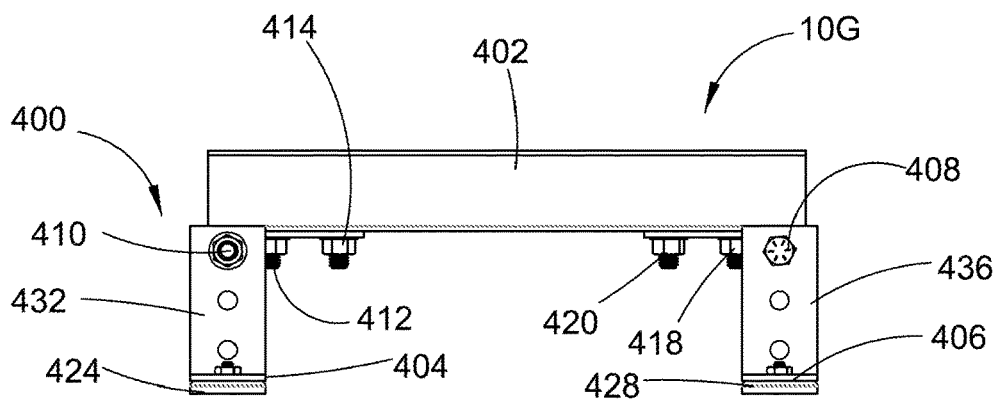
FIG. 50 depicts a side elevational view of a curvature adjustable magnetic strut having two strut base plates securing two hinged brackets one on each end of the strut, wherein the hinged brackets each have a base plate including one or more magnets, here having two magnets per base plate.

FIG. 50 depicts a side elevational view of a curvature adjustable magnetic strut embodiment 10G assembly 400 having two single hinged bracket assemblies 432 and 436 affixed to ta slotted strut 402 using strut retaining bolts 412, 414, 416 and 418. At the end of each bracket assembly is located a magnet base plate 404 and 406. Magnet 424 on magnet base plate 432 and magnet 428 on magnet base plate 436 are clearly seen. Here is shown the position of the hinges proximal to the strut 402, and held in place using retaining bolts 408 and 410. The hinges (not seen, see FIG. 51 and FIG. 52) allow rotation of the bracket assemblies 432 and 436 which in turn allows for the alignment of the magnet base plates 404 and 406 to match the curvature of the fuel tank where the curvature adjustable magnetic strut embodiment 10G assembly 400 is being installed. In this way, the magnets are able to be mounted flush with the tank surface and enable maximum surface area holding by the magnets of the curvature adjustable magnetic strut embodiment 10G assembly 400 in place on the tank surface.

Figure 51:
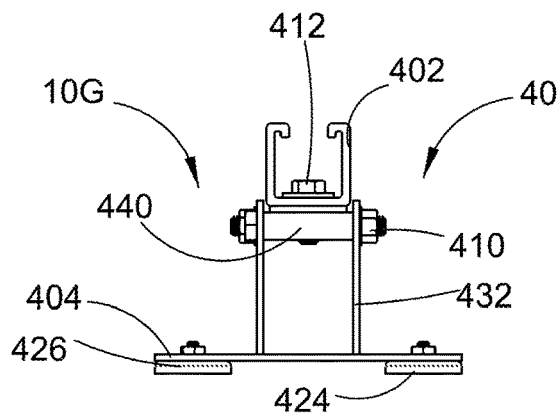
FIG. 51 depicts a front view of a curvature adjustable magnetic strut having two strut base plates securing two hinged brackets one on each end of the strut, wherein the hinged brackets each have a base plate including one or more magnets, here having two magnets per base plate.

FIG. 51 depicts a front view of a curvature adjustable magnetic strut two strut embodiment 10G assembly 400 having two strut securing base plates securing two hinged brackets one mounted on each end of the strut, wherein the hinged brackets each have a magnet base plate including one or more magnets, here having two magnets per magnet base plate. This FIG. 51 better illustrates the relative position of the hinge 440 about which bracket assembly 432 is able to rotate. It also shows the strut securing bolt 412 which secures the strut 402 to the bracket assembly 432.

Figure 52:
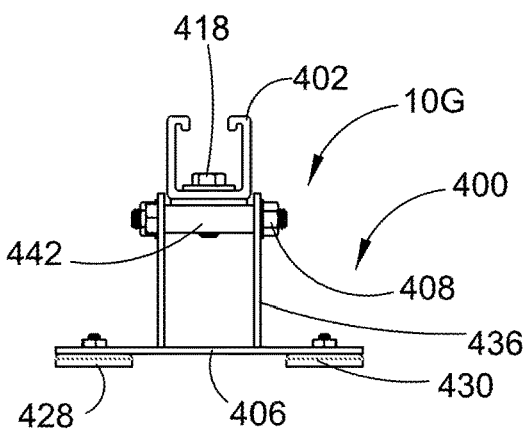
FIG. 52 depicts a rear view of a curvature adjustable magnetic strut two having strut base plates securing two hinged brackets one on each end of the strut, wherein the hinged brackets each have a base plate including one or more magnets, here having two magnets per base plate.

FIG. 52 depicts a rear view of a curvature adjustable magnetic strut embodiment 10G assembly 400 having two strut securing base plates securing two hinged brackets one mounted on each end of the strut, wherein the hinged brackets each have a magnet base plate including one or more magnets, here having two magnets per magnet base plate. This FIG. 52 better illustrates the relative position of the hinge 442 about which bracket assembly 436 is able to rotate. It also shows the strut securing bolt 418 which secures the strut 402 to the bracket assembly 436.

Figure 53:
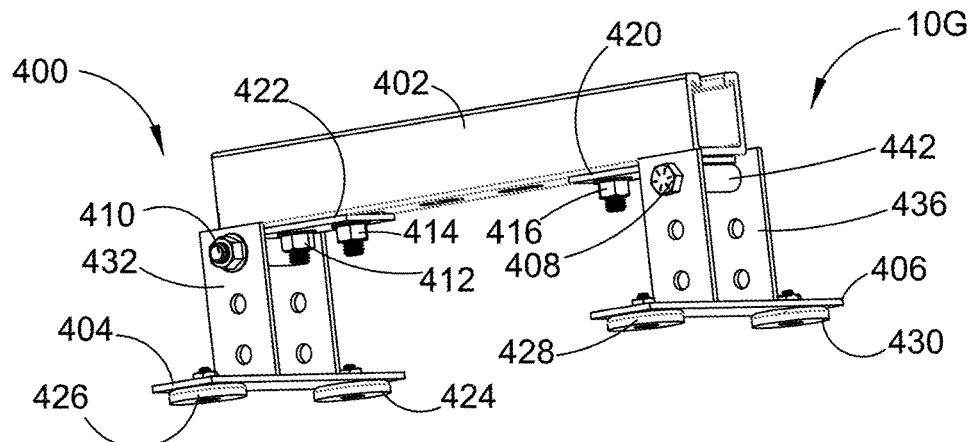
FIG. 53 depicts a bottom, side and front perspective view of a curvature adjustable magnetic strut having two strut base plates securing two hinged brackets one on each end of the strut, wherein the hinged brackets each have a base plate including one or more magnets, here having two magnets per base plate.

FIG. 53 depicts a bottom, side and front view of a curvature adjustable magnetic strut embodiment 10G assembly 400 having two strut securing base plates securing two hinged brackets one mounted on each end of the strut, wherein the hinged brackets each have a magnet base plate including one or more magnets, here having two magnets per magnet base plate.

Figure 54:
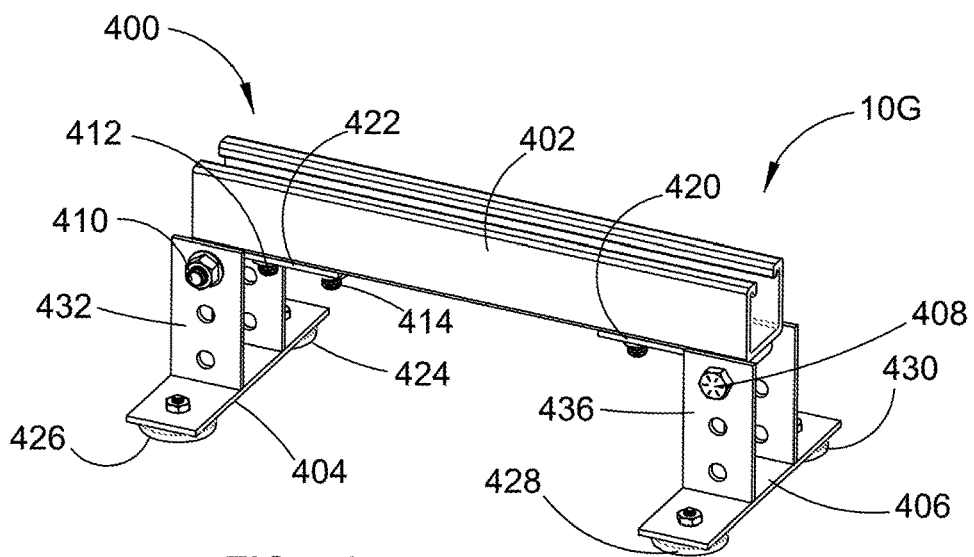
FIG. 54 depicts a top, side and front perspective view of a curvature adjustable magnetic strut having two strut base plates securing two hinged brackets one on each end of the strut, wherein the hinged brackets each have a base plate including one or more magnets, here having two magnets per base plate.

FIG. 54 depicts a top, side and front view of a curvature adjustable magnetic strut embodiment 10G assembly 400 having two strut securing base plates 420 and 422 securing two hinged bracket assemblies 432 and 436, one of each mounted on each end of the slotted strut 402, wherein the hinged brackets 432 and 436 each have a magnet base plate 404 and 406 each including one or more magnets, here having two magnets per magnet base plate, as represented by magnets 424, 426, 428 and 430. This FIG. 54 better illustrates the two bracket assemblies 432 and 436 and the hinge retaining bolts 408 and 410 with relation to the position of the slotted strut 402.

FIG. 55 depicts a top, side and front view of a curvature adjustable magnetic strut embodiment 10G assembly 400 having two strut securing base plates 420 and 422 securing two hinged bracket assemblies 432 and 436, one of each mounted on each end of the slotted strut 402, wherein the hinged brackets 432 and 436 each have a magnet base plate 404 and 406 each including one or more magnets, here having two magnets per magnet base plate, as represented by magnets 424, 426, 428 and 430. This FIG. 55 also illustrates the two bracket assemblies 432 and 436 and the hinge retaining bolts 408 and 410 with relation to the position of the slotted strut 402 as well as one of the two hinges 442.

FIG. 56 depicts a bottom, side and front view of a curvature adjustable magnetic strut embodiment 10G assembly 400 having two strut securing base plates 420 and 422 securing two hinged bracket assemblies 432 and 436, one of each mounted on each end of the slotted strut 402, wherein the hinged brackets 432 and 436 each have a magnet base plate 404 and 406 each including one or more magnets, here having two magnets per magnet base plate, as represented by magnets 424, 426, 428 and 430. This FIG. 56 better illustrates the two bracket assemblies 432 and 436 and the hinge retaining bolts 408 and 410 with relation to the position of the slotted strut 402 as well as both of the two hinges 440 and 442.

FIG. 57 depicts a top, side and front view of a curvature adjustable magnetic strut embodiment 10G assembly 400 having two strut securing base plates 420 and 422 securing two hinged bracket assemblies 432 and 436, one of each mounted on each end of the slotted strut 402, wherein the hinged brackets 432 and 436 each have a magnet base plate 404 and 406 each including one or more magnets, here having two magnets per magnet base plate, as represented by magnets 424, 426, 428 and 430. This FIG. 57 better illustrates the two bracket assemblies 432 and 436 and the and the bracket retaining bolts 412, 414, 416 and 418 with relation to the position of the slotted strut 402 as well as both of the two hinge pin retaining bolts 408 and 410.

Figure 58:
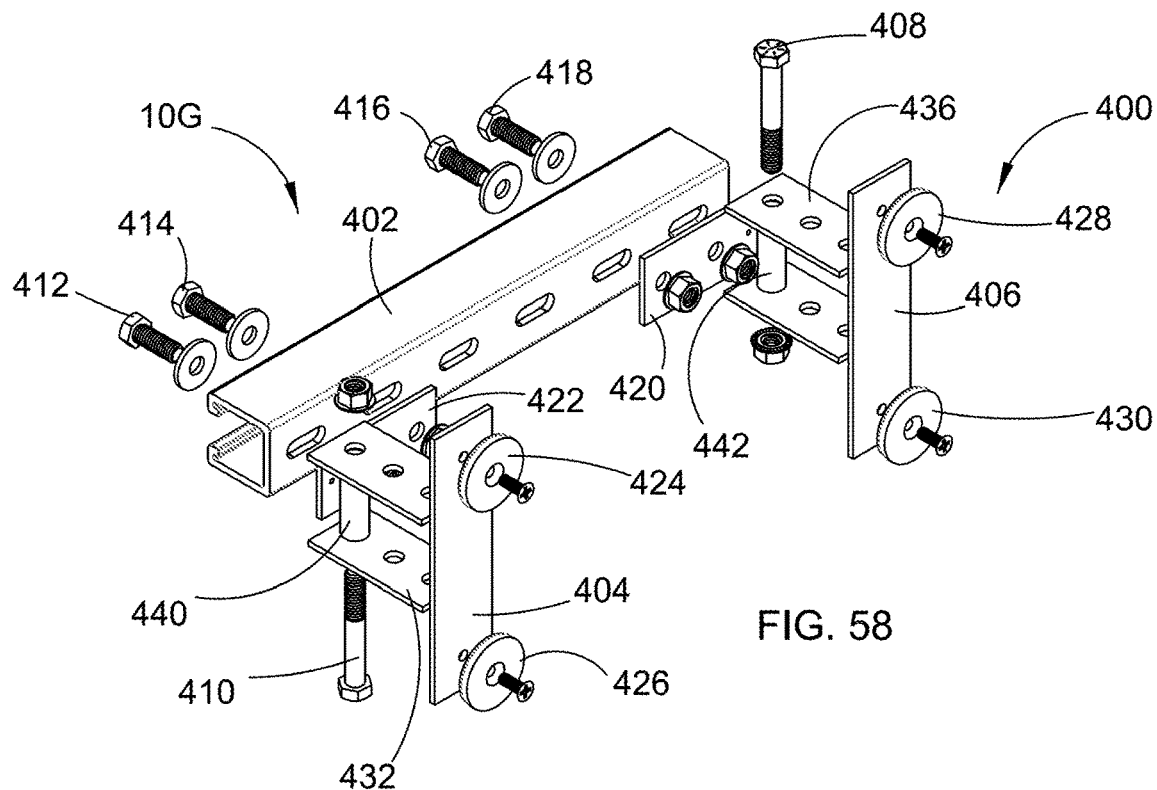
FIG. 58 depicts a bottom, side and front perspective exploded view of a curvature adjustable magnetic strut having two strut base plates securing two hinged brackets one on each end of the strut, wherein the hinged brackets each have a base plate including one or more magnets, here having two magnets per base plate.

FIG. 58 depicts a bottom, side and front exploded view of a curvature adjustable magnetic strut embodiment 10G assembly 400 having two strut securing base plates 420 and 422 securing two hinged bracket assemblies 432 and 436, one of each mounted on each end of the slotted strut 402, wherein the hinged brackets 432 and 436 each have a magnet base plate 404 and 406 each including one or more magnets, here having two magnets per magnet base plate, as represented by magnets 424, 426, 428 and 430. This exploded view of FIG. 58 better illustrates the two magnet base plates 404 and 406 and the two magnets affixed to the two magnet base plates 404 and 406, namely, magnets 424, 426, 428 and 430. It also illustrates that the four strut securing plate bolts 412, 414, 416 and 418 which affix the two bracket assemblies 432 and 436 actually pass through the slots in the slotted strut 402, then through orifices in the strut securing plates 420 and 422 to attach the bracket assemblies rotatably to the hinges 440 and 442. The strut securing plates 420 and 422 are welded to the hinges 440 and 442 before the hinges are mounted to the brackets using the hinge pin bolts 408 and 410.

Figure 59:
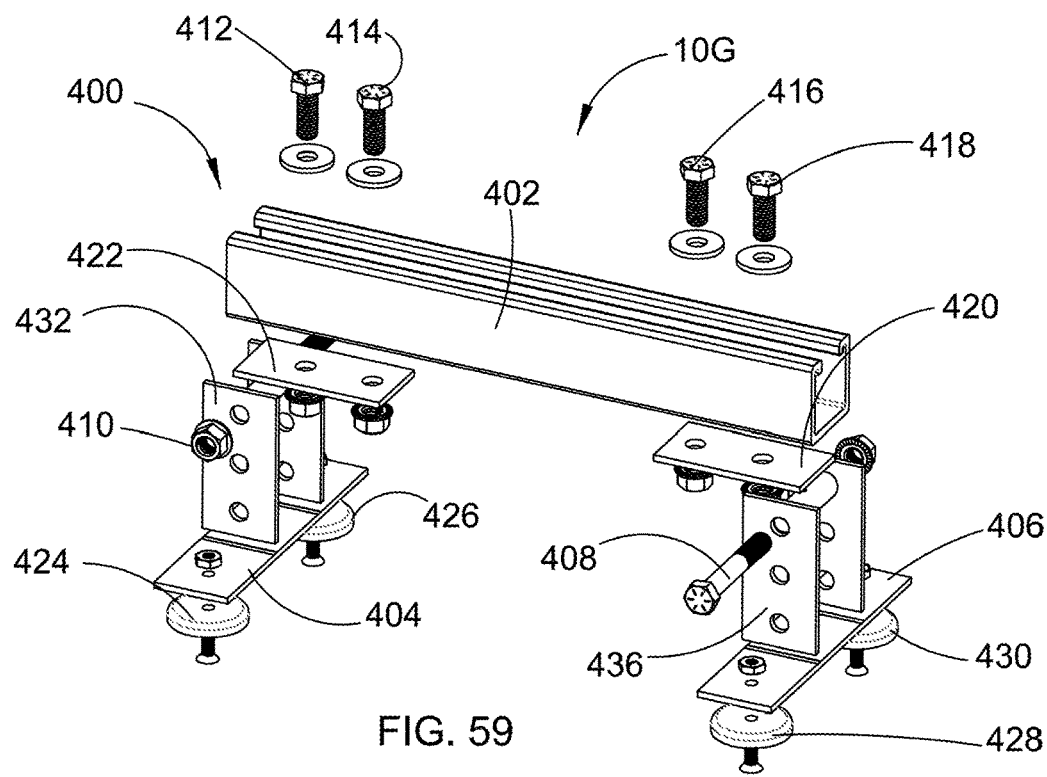
FIG. 59 depicts a top, side and front perspective exploded view of a curvature adjustable magnetic strut having two strut base plates securing two hinged brackets one on each end of the strut, wherein the hinged brackets each have a base plate including one or more magnets, here having two magnets per base plate.

FIG. 59 depicts a top, side and front exploded view of a curvature adjustable magnetic strut embodiment 10G assembly 400 having two strut securing base plates 420 and 422 securing two hinged bracket assemblies 432 and 436, one of each mounted on each end of the slotted strut 402, wherein the hinged brackets 432 and 436 each have a magnet base plate 404 and 406 each including one or more magnets, here having two magnets per magnet base plate, as represented by magnets 424, 426, 428 and 430. This exploded view of FIG. 58 better illustrates the two strut securing plates 420 and 422 and the four strut securing plate bolts 412, 414, 416 and 418 which affix the two bracket assemblies 432 and 436. Also shown are the four magnets 424, 426, 428 and 430 secured to the two magnet base plates 404 and 406. When assembled, the four strut securing plate bolts 412, 414, 416 and 418 are affixed to the two bracket assemblies 432 and 436 actually pass through the slots in the slotted strut 402, then pass through orifices in the strut securing plates 420 and 422 to attach the bracket assemblies rotatably to the hinges 440 and 442. Then, the strut securing plates 420 and 422 are welded to the hinges 440 and 442 before the hinges are mounted to the brackets using the hinge pin bolts 408 and 410. In this way, the bracket assemblies are free to rotate about the hinges to align with the curved surface of a curved fuel tank.

In summary, for the curvature adjustable magnetic strut assemblies 10E, 10F and 10G, these obvious variants of the present invention are constructed of: a variable length of slotted strut; two or more single or double hinged bracket assemblies; magnet base plates attached to each of the two to four or more variable length single or double hinged bracket assemblies, and magnets affixed to the magnet base plates; in such a way that the hinges allow rotation of the brackets to conform to a curved surface for mounting the magnets of the curvature adjustable magnetic strut assemblies 10E, 10F and 10G to the fuel tank to accomplish a secure installation of the strut for securing pipe, conduit and tubing thereon. The way in which these embodiments are constructed and operate make them equally applicable to use on curved tank surfaces as well as flat tank surfaces, and can be installed on the surface of any type of tank.

The Curvature Adjustable Magnetic Strut primary features will include as prominent design and operational features:

a variable length strut member with securing strut base plates;

one or more magnet base plates affixed to the variable length strut member;

two or more magnets attached to each magnet base plate;

two or more strut base plates secured single hinged bracket assemblies including one or more magnetic base plates affixed to each bracket assembly; and two or more strut base plates secured double hinged bracket assemblies including one or more hinged magnetic base plates affixed to each hinged bracket assembly having a hinged magnetic base plate.

The Curvature Adjustable Magnetic Strut 10A, 10B, 10C, 10D, 10E, 10F and 10G shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Curvature Adjustable Magnetic Strut 10A, 10B, 10C, 10D, 10E, 10F and 10G in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A curvature adjustable magnetic strut assembly, comprising:
   (a) a strut section having a lower portion, wherein the strut section is associated with a block member having an upper surface and a lower surface, wherein said strut section lower portion is secured to said block member upper surface;
   (b) a curvature adjustable base plate having a predetermined length and a predetermined lengthwise curvature value, wherein the curvature adjustable base plate is secured to said block member lower surface, wherein the curvature adjustable base plate has lengthwise spaced-apart opposite end portions;
   (c) two curvature adjustment bolts and two curvature adjustment nuts, wherein each one of the two curvature adjustment bolts is associated with a respective one of the two curvature adjustment nuts, wherein the strut section defines two apertures each of which is spaced proximate to one of the curvature adjustable base plate opposite end portions, wherein each one of the two curvature adjustment nuts overlays an associated one of the two apertures and is secured to said strut section lower portion, wherein each one of the two curvature adjustment bolts defines an externally threaded portion of predetermined length oriented along an axis, wherein each one of the two curvature adjustment nuts defines internal threads configured for engaging the threaded portion of its associated curvature adjustment bolt, wherein an end portion of at least one curvature adjustment bolt engages the curvature adjustable base plate when the at least one curvature adjustment bolt threadedly engages its associated curvature adjustment nut and extends through one of said two apertures a predetermined distance from the strut section lower portion; and
   (d) three or more spaced-apart magnets each of which is removably affixed seriatim to the base plate along the predetermined length thereof;
   wherein said at least one curvature adjustment bolt, with its end portion engaging the base plate, is rotated about its axis by a torque value effective for increasing the predetermined distance, thereby changing the predetermined lengthwise curvature value of the curvature adjustable base plate to a greater lengthwise curvature value.

2. The curvature adjustable magnetic strut assembly of claim 1, wherein said strut section includes a variable length slotted strut portion.

3. The curvature adjustable magnetic strut assembly of claim 1, wherein said strut section lower portion is welded to said block member upper surface by welding.

4. A curvature adjustable magnetic strut assembly, comprising:
   (a) a strut section having a lower portion, wherein the strut section is associated with a block member having an upper surface and a lower surface, wherein said strut section lower portion is secured to said block member upper surface;
   (b) a curvature adjustable base plate having a predetermined length and a predetermined lengthwise curvature value, wherein the curvature adjustable base plate is secured to said block member lower surface, wherein the curvature adjustable base plate has lengthwise spaced-apart opposite end portions;
   (c) two curvature adjustment bolts and two curvature adjustment nuts, wherein each one of the two curvature adjustment bolts is associated with a respective one of the two curvature adjustment nuts, wherein the strut section defines two apertures each of which is spaced proximate to an associated one of the curvature adjustable base plate opposite end portions, wherein each one of the two curvature adjustment nuts overlays an associated one of the two apertures and is secured to said strut section lower portion, wherein each one of the two curvature adjustment bolts defines an externally threaded portion of predetermined length oriented along an axis, wherein each one of the two curvature adjustment nuts defines internal threads configured for engaging the threaded portion of its associated curvature adjustment bolt, wherein an end portion of at least one curvature adjustment bolt engages the curvature adjustable base plate when the at least one curvature adjustment bolt threadedly engages its associated curvature adjustment nut and extends through one of said two apertures a predetermined distance from the strut section lower portion; and
   (d) three or more spaced-apart magnets each of which is removably affixed seriatim to the base plate along the predetermined length thereof;
   wherein said at least one curvature adjustment bolt, with its end portion engaging the base plate, is rotated about its axis by a torque value effective for increasing the predetermined distance, thereby changing the predetermined lengthwise curvature value of the curvature adjustable base plate to a greater lengthwise curvature value,
   wherein each one of said three or more spaced-apart magnets is removably affixed to the curvature adjustable base plate by an associated magnet-retaining bolt to which an associated magnet-retaining nut is threadedly engaged.

5. A curvature adjustable magnetic strut assembly, comprising:
   (a) a strut section having a lower portion, wherein the strut section is associated with a block member having an upper surface and a lower surface, wherein said strut section lower portion is secured to said block member upper surface;
   (b) a curvature adjustable base plate having a predetermined length and a predetermined lengthwise curvature value, wherein the curvature adjustable base plate is secured to said block member lower surface, wherein the curvature adjustable base plate has lengthwise spaced-apart opposite end portions;
   (c) two curvature adjustment bolts and two curvature adjustment nuts, wherein each one of the two curvature adjustment bolts is associated with a respective one of the two curvature adjustment nuts, wherein the strut section defines two apertures each of which is spaced proximate to an associated one of the curvature adjustable base plate opposite end portions, wherein each one of the two curvature adjustment nuts overlays an associated one of the two apertures and is secured to said strut section lower portion, wherein each one of the two curvature adjustment bolts defines an externally threaded portion of predetermined length oriented along an axis, wherein each one of the two curvature adjustment nuts defines internal threads configured for engaging the threaded portion of its associated curvature adjustment bolt, wherein an end portion of at least one curvature adjustment bolt engages the curvature adjustable base plate when the at least one curvature adjustment bolt threadedly engages its associated curvature adjustment nut and extends through one of said two apertures a predetermined distance from the strut section lower portion; and (d) three or more spaced-apart magnets each of which is removably affixed seriatim to the base plate along the predetermined length thereof;

wherein said at least one curvature adjustment bolt, with its end portion engaging the base plate, is rotated about its axis by a torque value effective for increasing the predetermined distance, thereby changing the predetermined lengthwise curvature value of the curvature adjustable base plate to a greater lengthwise curvature value, further including at least four stabilization bolts and at least four associated stabilization nuts each of which is individually secured to said curvature adjustable base plate.

* * * * *